US008793184B2

(12) United States Patent
Lakshminarayanan

(10) Patent No.: US 8,793,184 B2
(45) Date of Patent: Jul. 29, 2014

(54) MOBILE PAYMENT SERVICES

(75) Inventor: Dhamodharan Lakshminarayanan, Austin, TX (US)

(73) Assignee: Visa U.S.A. Inc., San Francisco, CA (US)

( * ) Notice: Subject to any disclaimer, the term of this patent is extended or adjusted under 35 U.S.C. 154(b) by 176 days.

(21) Appl. No.: 12/027,809

(22) Filed: Feb. 7, 2008
(Under 37 CFR 1.47)

(65) Prior Publication Data
US 2008/0275779 A1 Nov. 6, 2008

Related U.S. Application Data

(60) Provisional application No. 60/889,443, filed on Feb. 12, 2007.

(51) Int. Cl.
| | |
|---|---|
| *G06Q 20/40* | (2012.01) |
| *G06Q 20/32* | (2012.01) |
| *G06Q 20/38* | (2012.01) |
| *G06Q 20/04* | (2012.01) |
| *G06Q 20/10* | (2012.01) |
| *G06Q 20/12* | (2012.01) |
| *G06Q 20/02* | (2012.01) |

(52) U.S. Cl.
CPC .............. *G06Q 20/32* (2013.01); *G06Q 20/327* (2013.01); *G06Q 20/325* (2013.01); *G06Q 20/3823* (2013.01); *G06Q 20/04* (2013.01); *G06Q 20/3227* (2013.01); *G06Q 20/10* (2013.01); *G06Q 20/40* (2013.01); *G06Q 20/3223* (2013.01); *G06Q 20/12* (2013.01); *G06Q 20/02* (2013.01)
USPC ................................ 705/39; 705/44; 235/379

(58) Field of Classification Search
None
See application file for complete search history.

(56) References Cited

U.S. PATENT DOCUMENTS

| | | | |
|---|---|---|---|
| 6,343,284 B1 | 1/2002 | Ishikawa et al. | |
| 6,915,271 B1 * | 7/2005 | Meyer et al. ............... | 705/14.35 |

(Continued)

FOREIGN PATENT DOCUMENTS

| | | |
|---|---|---|
| JP | 11-316729 | 11/1999 |
| JP | 2001-250062 A | 9/2001 |

(Continued)

OTHER PUBLICATIONS

Kannegaare (J2EE BluePrints, Mar. 20 2000 retrieved from java.sun.com/blueprints/gidelines/designing_enterprise_applications/apmTOC.html: Sep. 6, 2005; 6 pages.*

(Continued)

*Primary Examiner* — Ella Colbert
*Assistant Examiner* — Mary Gregg
(74) *Attorney, Agent, or Firm* — Kilpatrick Townsend & Stockton LLP

(57) ABSTRACT

A Java 2 Enterprise Edition (J2EE) enabled server executing Java software provides a financial transaction Web service to a client each of which communicates wirelessly with the J2EE enabled server and executes Java software to conduct financial transactions between a merchant and a consumer upon an account issued by an issuer to the consumer. Each financial transaction is submitted by the merchant to an acquirer for processing by a transaction handler/payment processor, and is submitted by the transaction handler/payment processor to the issuer to obtain a payment amount for the financial transaction from the account, and wherein the issuer forwards the payment amount of the financial transaction to the transaction handler/payment processor who forwards the payment amount of the financial transaction to the acquirer to pay the merchant for the financial transaction.

16 Claims, 18 Drawing Sheets

(56) References Cited

U.S. PATENT DOCUMENTS

| | | | |
|---|---|---|---|
| 7,082,432 B2* | 7/2006 | Bhogi et al. ............................ 1/1 |
| 7,477,889 B2* | 1/2009 | Kim ............................... 455/411 |
| 7,725,388 B2* | 5/2010 | Wilkinson ....................... 705/39 |
| 2002/0194499 A1* | 12/2002 | Audebert et al. .............. 713/201 |
| 2003/0080183 A1* | 5/2003 | Rajasekaran et al. .......... 235/379 |
| 2003/0101208 A1 | 5/2003 | Chauvel et al. |
| 2003/0228910 A1* | 12/2003 | Jawaharlal et al. ............. 463/42 |
| 2004/0230490 A1* | 11/2004 | Barsade et al. ................. 705/26 |
| 2005/0044197 A1 | 2/2005 | Lai |
| 2006/0077100 A1 | 4/2006 | Dahms et al. |
| 2007/0055440 A1* | 3/2007 | Denker et al. ................ 701/200 |
| 2007/0131761 A1 | 6/2007 | Smets et al. |
| 2007/0169052 A1* | 7/2007 | Vanrenen et al. ............. 717/154 |
| 2008/0077526 A1* | 3/2008 | Arumugam ..................... 705/44 |
| 2008/0126251 A1* | 5/2008 | Wassingbo ...................... 705/44 |
| 2008/0263630 A1* | 10/2008 | Harada et al. ..................... 726/2 |

FOREIGN PATENT DOCUMENTS

| | | |
|---|---|---|
| JP | 2007-317173 A | 12/2007 |
| WO | 2005/079254 A2 | 9/2005 |
| WO | WO 2006/124808 | 11/2006 |

OTHER PUBLICATIONS

Java Development News; Developers Guide to Building XML-Based Web Services with the Java 2 Platform enterprise Edition by James Kao; Jun. 1, 2001: theserverside.com; http://www.theserverside.com/news/1365386/Developers-Guide-to-Building-XML-based-Web-Services-with-the-Java-2-Platform-Enterprise-Edition-J.*

Java Thick Clients with J2ME by Glenn Coates : Jun. 1, 2001 at java.sys-con.com/node/36305; 8 pages.*

Dive Into Connection Pooling with J2EE; Manage Access to Shared, Server-Side Resources for High Performance by Sova VisvesWaran; From JavaWorld; Oct. 2000; 8 pages.*

Future Trends of S60 Based devides development by Aton Spiridov at Mobile Review.com Future trends of s60-Based devices Development pp. 15; Oct. 2, 2006.*

Simplified Guide to the Java 2 Platform Enterprise Edition; Copyright @ 1999, Sun Microsystems, Inc; 13 pages.*

Mobile Wireless; Nov. 2002, 4th infocomm Technology Roadmap report 2002-2007 by IDA: Infocomm Development authority of Singapore by Dr. Brian Chen; Chief Techology Officer; Infocomm Development Authority of Singapore; 146 pages at http://www.ida.gov.sg/doc/Technology/Technology_Level1/20060417212727/ITR4MobileWireless.pdf.*

Projects for Lecturing Wireless Java by Hans Weghorn; University of Cooperative Education; Rotebuhlplatz 41, 70718 Stuttgart, Germany; @ http://www.iadis.net/dl/final_uploads/200301C107.pdf; 5 pages.*

Seminar Report on Survey of Smartcard and Mobile Payments by Tijo Thomas (03229401); KReSIT IIT Bombay; 27 pages; @ www.it.iitb.ac.in/~tijo/seminar/seminarreport.pdf.*

Using the Java Language to Develop Mobile Internet Applications by Guangwen Liu; 2001-2002; 89 pages VRIJE Universiteit Brussel; Faculty of Applied Sciences;[PDF] @ citeseerx.ist.psu.edu/viewdoc/download?doi=10.1.1.11...rep...You +1'd this publicly. Undo.*

H. Haverinen: "EAP SIM Authentication" IETF, [online] Feb. 2003, pp. 1-52, XP002293906; retrieved on Aug. 24, 2001 from URL:http://www. watersprings.org/pub/id/draft-haverinen-pppext-eap-sim- 10.txt.*

Tanimoto, Toru, "Comprehensive List of Java Technologies in a Web Service Era," *JAVA Developer*, No. 1, Japan, Softbank Publishing Co., Ltd., Aug. 1, 2002, p. 38-48.

Japanese Patent Application No. 2009-549671, Official Action mailed Oct. 21, 2013, with English translation.

Mexican Patent Application No. MX/a/2009/008650, Official Action mailed Oct. 9, 2013, with English translation (Google).

* cited by examiner

MOBILE PAYMENT SERVICES

CROSS-REFERENCE TO RELATED APPLICATIONS

This application is a Non-Provisional Application and claims priority to, and the benefit of, U.S. Provisional Application Ser. No. 60/889,443, filed Feb. 12, 2007, entitled "MOBILE SERVICES," the entire contents of which is hereby incorporated by reference.

FIELD

Implementations generally relate to financial transactions, and is more particularly related to financial transactions conducted with a mobile consumer electronics device.

BACKGROUND

Consumer transactions with merchants are increasingly being made payable with other than cash or checks. More recently, the device being used by consumers to conduct such consumer transactions is a mobile consumer electronics device having wireless communications functionality, such as a cellular telephone or a Personal Digital Assistant (PDA). Such mobile consumer electronics devices lack interoperability.

One application protocol used by mobile consumer electronics devices having wireless communications functionality is I the Wireless Application Protocol (WAP). WAP, however, has its limitations. WAP requires key improvements in security, and also requires constant air time for offline operations. WAP places limitations on a rich user interface, and lacks compatibility between micro-browsers. WAP required different gateways from different vendors Another such protocol is I-mode protocol, which is a wireless data service that is accessed by a wireless packet network and the contents are described in a subset of the HTML language. One problem with the I-mode protocol is that there is no client side scripting language like the Wireless Markup Language (WML), where WML is a language that allows the text portions of Web pages to be presented on cellular telephones and personal digital assistants (PDAs) via wireless access. Also, the I-Mode protocol is not available in all geographic regions.

Consequently, there is a need in the art to provide a mobile consumer electronics device having wireless communications functionality by which a consumer can conduct a cashless transaction on an account issued to the consumer by an issuer, where the transaction is conducted by the consumer with a merchant, and where executable instructions enabling the transaction on the mobile device will interoperate on a variety of different mobile devices (e.g.; cellular telephones, PDAs, palmtop computers, etc.) as one application offering different types of financial transactions and multiple related services.

SUMMARY

In one implementation, a wireless financial transaction system includes a Java 2 Enterprise Edition (J2EE) enabled server executing a Java software product to provide a financial transaction Web service to Web enabled clients. Each client is served the financial transaction Web service in wireless communications with the J2EE enabled server. Each client executes a Java language software product to conduct a financial transaction between a merchant and a consumer upon an account issued by an issuer to the consumer in collaboration with the financial transaction Web service. The financial transaction is conducted at least in part in a wireless communication with the client and the J2EE enabled server. Each financial transaction is submitted by the merchant to an acquirer for processing by a transaction handler/payment processor, and is submitted by the transaction handler/payment processor to the issuer to obtain a payment amount for the financial transaction from the account, and wherein the issuer forwards the payment amount of the financial transaction to the transaction handler/payment processor who forwards the payment amount of the financial transaction to the acquirer to pay the merchant for the financial transaction.

In another implementation, the Web enabled clients are Java 2 Standard Edition (J2SE) enabled thick clients that can be a workstation, a personal computer, or a laptop computer. Each thick client executes an operating system (OS) to perform OS specific commands and the Java software product to conduct the financial transaction is byte code converted by a Java Virtual Machine (JVM) into the OS specific commands performed by the OS.

In yet another implementation, the Web enabled clients are Java 2 Micro Edition (J2ME) enabled thin client. These thin clients can have a Connected Limited Device Configuration (CDLC) with a J2ME configuration and can execute an operating system (OS) to perform OS specific commands, where the Java software product to conduct the financial transaction is byte code converted by a compact Java Virtual Machine (KVM) into the OS specific commands performed by the OS.

In a still further implementation, a wireless financial transaction system includes a Java 2 Enterprise Edition (J2EE) enabled server executing a Java software product to provide a financial transaction Web service smart cards. Each smart card has a digital signal processor executing an operating system (OS) to perform OS specific commands and executing a Java software product to conduct a financial transaction in byte code converted by a Card Virtual Machine (KVM) into the OS specific commands performed by the OS. The smart card is served the financial transaction Web service in wireless communications with the J2EE enabled server and executed a Java language software product to conduct a financial transaction in collaboration with the financial transaction Web service. The financial transaction is conducted at least in part wireless communication with the smart card and is conducted with a merchant upon an account issued by an issuer to a consumer.

BRIEF DESCRIPTION OF THE DRAWINGS

Implementations will become more apparent from the detailed description set forth below when taken in conjunction with the drawings, in which like elements bear like reference numerals.

DETAILED DESCRIPTION

Cashless transactions conducted with one or more wireless devices are addressed in various exemplary implementations described for a payment processing system. The cashless transactions, which are conducted within the payment processing system, can be conducted on many consumer hand held communications device such as cellular telephones and Personal Digital Assistants in an environment that is disclosed as being architected for simplicity, security, user friendliness, multi-functionality, interoperability, having multi-lingual capability, for cost effectiveness, and high performance and reliability.

In this architected environment, a consumer hand held communications device can be used to make person to person money transfers, proximity payments from a consumer to a merchant, make an on-line purchase, maintain accounts, set up and receive fraud, money transfer, and identity theft notifications, set up automatic bill payments, take out a loan to make a purchase, receive automatic bill payment alerts, load money on to an account, as well as other functions.

The cashless transactions that are conducted with one or more wireless devices, as described herein, are applicable for transactions with payment processing system. Within the payment processing system, a transaction handler processes a transaction characterized by a consumer and a merchant engaging in the transaction upon an account that has been issued to the consumer by an issuer. The account will preferably be a non-credit account such as a prepaid account, a debit account, a deposit account, a flexible spending account, a health savings account, or combinations thereof. The merchant may be a retailer, a wholesaler, a reseller, a manufacturer, or a distributor, for example. As used herein, if a merchant is engaged in making a purchase in a transaction from another merchant, then the purchasing merchant will be deemed to be the consumer and the selling merchant will be deemed to be the merchant for that transaction.

Figure 1:
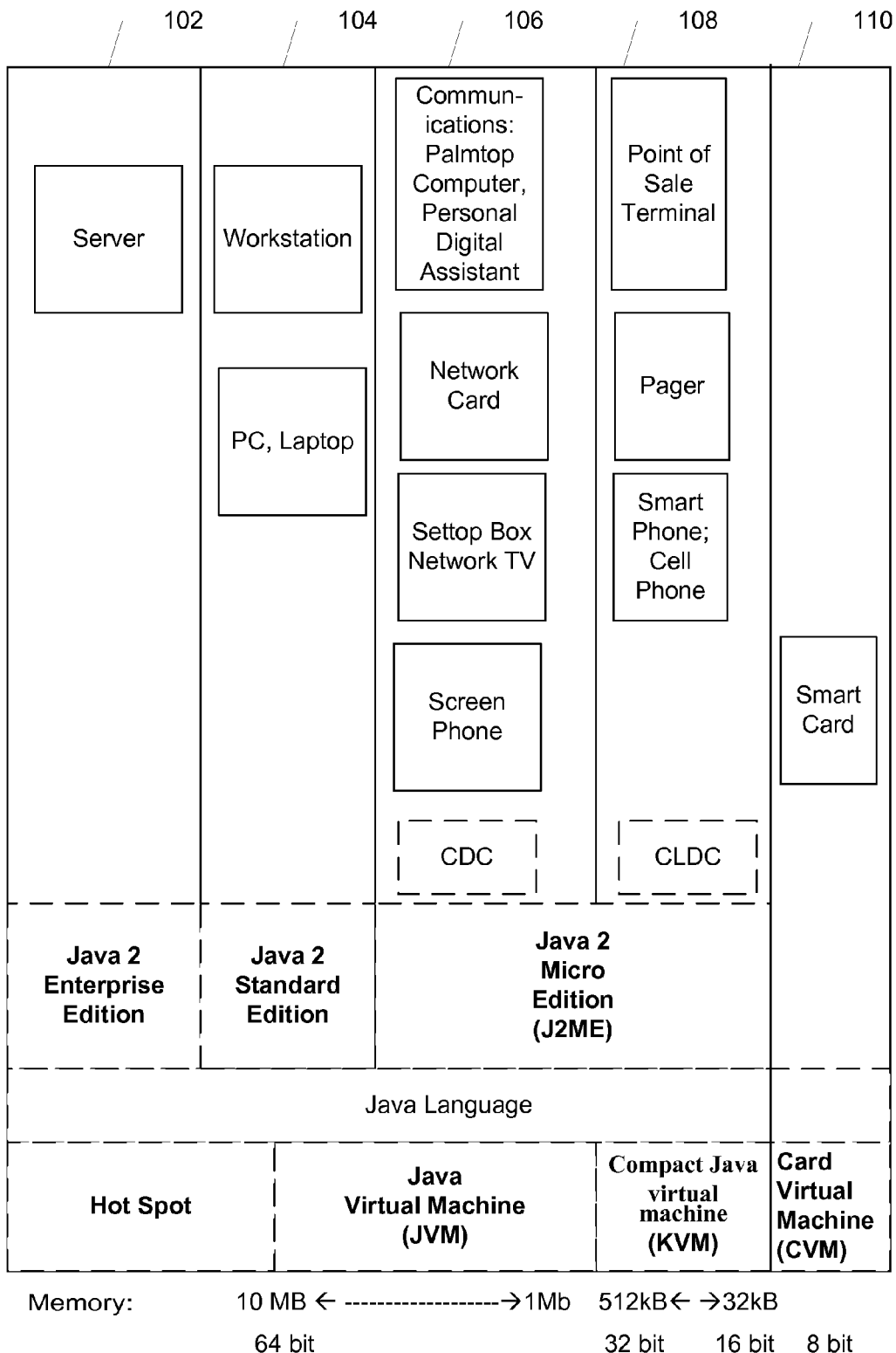
FIG. 1 illustrates a functional block diagram of exemplary environment of varying scale from servers to smart cards that can operated in a architecture for a Java environment to conduct wireless cashless transactions.

Referring to FIG. 1, a flowchart depicts an exemplary implementation of a hardware/Java enabled ultimate commerce (U-Commerce) environment 100 facilitated for mobile transactions in a payment processing system. U-Commerce represents an environment which is enabled by changes introduced by numerous networks and network devices that can be connected through the Internet. U-Commerce is further enabled by wireless technology which loosen restrictions on the location from which a communication task is accomplished.

Segment 102 of environment 100 is a exemplary server implementation in which a server executes Java 2 Enterprise Edition using the Java language, where one such application is for a hot spot where a wireless fidelity access point is located or for an area where this is an open wireless network.

Segment 104 of environment 100 is an exemplary segment for workstation, PC and laptop implementations. Section 104 devices can execute Java 2 Standard Edition using the Java language. One such application for segment 104 is a Java virtual machine (JVM).

Segment 106 of environment 100 is for implementations of various mobile communicators including palm top computers, personal digital assistant with communication capabilities, network cards, cable or satellite set-top boxes for network television, and audio visual telephonic equipment such as screen phones. These communicators can be Connective Device Configuration (CDC) for implemented devices for a Java 2 Micro Edition (J2ME) configuration. In particular, the CDC device in segment 106 will have more memory and more processing power than a J2ME Connected Limited Device Configuration (CDLC) device in segment 108. The CLDC serves the market consisting of personal, mobile, connected information devices. This configuration includes some new classes designed specifically to fit the needs of small-footprint devices. A CDLC device has a J2ME connected limited device configuration. In particular, the CLDC device serves the market of mobile personal and connected information devices. Relative to the CDC device, the network condition connection thereof is 'always-on' with a minimum of two megabytes of memory available for the job assistant.

Segment 106 of environment 100 uses Java 2 Micro Edition (J2ME) and the Java language. A like segment 104, segment 106 is for a Java Virtual Machine (JVM).

Segment 108 of environment 100 is for various devices including Point Of Sale terminals (POS), pagers, smart phones, cell phones, and related mobile devices. Here, segment 108 is for CLDC devices, or J2ME connected limited device configuration devices. In particular, the virtual machine for segment 108 is the compact Java virtual machine (KVM).

Segment 110 of environment 100 is for smart cards using Java language with the particular virtual machine being the card virtual machine (CVM).

As seen FIG. 1, memory needed for each of the segments 102-10 is shown at the bottom of each segment. Segment 102-104 will have between approximately ten and one megabytes of memory running at a 64 bit configuration, whereas segment 108 operates in a memory size of 512 kB through 32 kB, where the bit size ranges from 32 bit to 16 bit. Lastly, segment 110 is about the 8 bit range.

Environment 100 see in FIG. 1, places an emphasis on Java version 2 Micro Edition (J2ME) for various meritorious reasons. These include the ability to write code only once and yet be able to run it on any mobile device. J2ME also provides end-to-end-N security using standard HTTPS protocol. Moreover, there can be a dynamic delivery of applications and services using J2ME. The foregoing provide an enhanced user experience, scalability, and enhanced performance. Applications can be downloaded over-the-air to mobile devices, such as J2ME applications. J2ME supports wireless messaging services such as SMS and others. In sum, J2ME as depicted in the exemplary implementation of environment 100 provides secured network capability, rich graphical user interfaces and secured persistence capability for each mobile device having a corresponding and compatible implementations.

Figure 2:
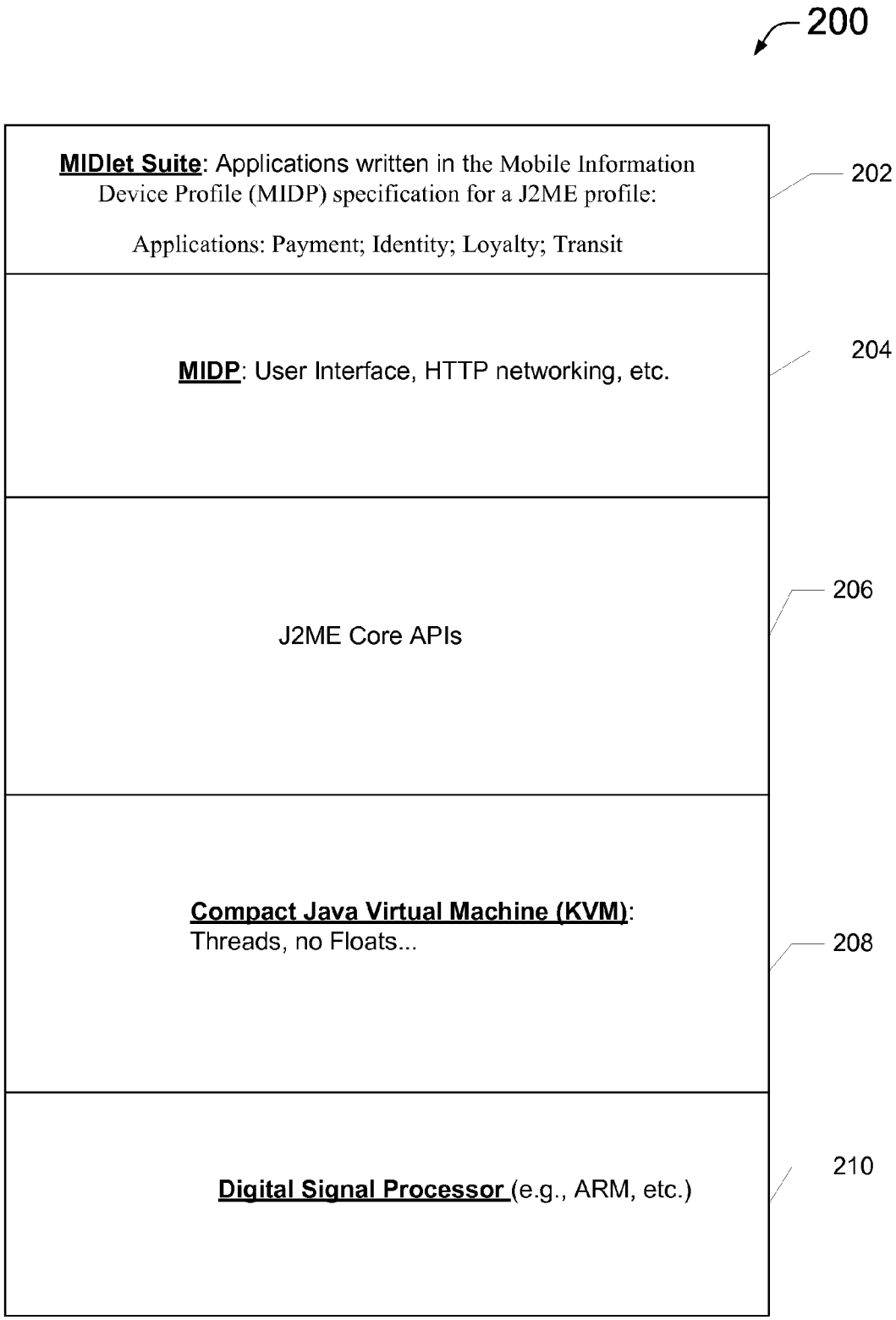
FIG. 2 illustrates an exemplary J2ME device stack for a mobile consumer electronics device having wireless communications functionality that can be used by a consumer to conduct a cashless transaction in the environment depicted in FIG. 1.

FIG. 2 shows an exemplary Java 2 Micro Edition (J2ME) device stack for a mobile device. By way of example, and not by way of limitation, a mobile device might be a cellular telephone using the exemplary J2ME device stack 200. At the bottom of the stack is a digital signal processor (DSP) 210. By way of example, DSP 210 might be a ARM chip, such as a 32-bit RISC, 256 k ROM, 256 k Flash, 64 k RAM, etc. The next layer in the stack is a compact Java Virtual Machine (KVM) 208 In KVM 208, there are threads and no floats. For a device having the stack 200, preferably there will be a J2ME connected limited device configuration (CLDC) which have KVM and Java 2 Micro Edition core Application Program Interfaces (APIs), by way of example.

The next layer in the stack is J2ME core API's 206. In particular, layer 206 of stack 200 shows various APIs that can be used to interface between applications being run on the device (e.g.; a cellular telephone) and the JVM running J2ME.

Layer 204 in stack 200 is for a mobile information device profile. These include a user interface and hypertext transfer protocol (HTTP) networking, for example.

The highest level in stack 200 is layer 202 which is particular MIDlet applications. A MIDlet application can be one of a suite of such applications. In particularly, a MIDlet is an application written for the mobile information device profile (MIDP). MIDlet applications are subclasses of JAVAX.micro edition.MIDlet.MIDlet class that is defined by the MIDP. The MIDP is a specification for a J2ME profile. It is layered on top of CLDC and adds APIs for application life cycle, user interface, networking, and persistent storage. Example of applications in the MIDlet suite would be a payment application, an identity application, a loyalty application for awarding loyalty of a consumer with a credit card towards a merchant accepting such credit cards, or for awarding a particular loyalty of a consumer for using of a particular brand of credit cards (e.g., American Express, Master, Visa, Diners Club, etc.) Another application in the MIDlet suite would be a transit application which allows a user to use an account to be able to gain access to a transit facility such as a subway, a bus, train, light rail, etc.

Figure 3:
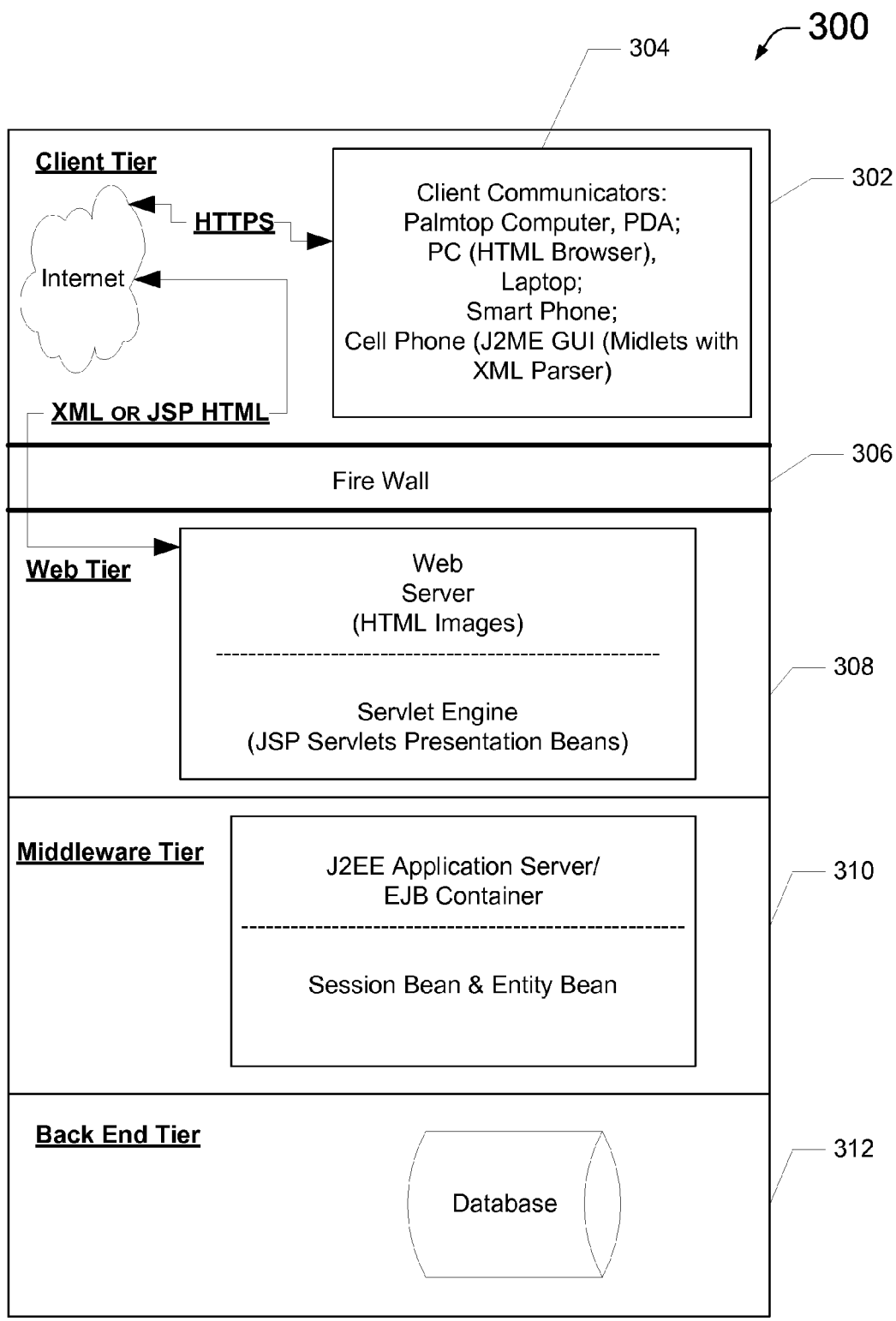
FIG. 3 illustrates a functional block diagram of exemplary architecture for a wireless cashless transaction system enabled by Java 2 Platform, Micro Edition (J2ME)

FIG. 3 depicts an exemplary J2ME system which particularly depicts an exemplary architecture 300 for U-Commerce. The architecture 300 has a back end tier 312, a middle end tier 310, a web tier at 308, a firewall 306, and a client tier 302.

Back end tier 312 includes a database for storing data used by other tiers within the U-Commerce architecture 300. The middle layer tier 310 includes a J2EE application server and an EJB container as well as an enterprise bean having the components of a session bean and an entity bean. As used herein, J2EE is to be understood as the Java 2 Platform, enterprise edition which is a version of Java for developing and employing enterprise applications, such as main frame-scale computing typical of large enterprises. As used herein, EJP or enterprise Java beans is a component architecture for the development and employment of object-oriented, distributed, enterprise-level applications. Applications written using the enterprise Java beans are scaleable, transactional and multi-user secure. The enterprise bean is a component that implements a business task or business entity and is of two types: an entity bean or a session bean as mentioned above.

Web tier 308 includes a web server (e.g.; serving HTML images) and a servlet engine (e.g., JSP servlets presentation beans). As used herein, JSP is to be understood as Java server pages which are normal HTML with Java code pieces embedded in them. A servlet is a Java program that runs on a web server where the service side Java program provides additional features to the server. Common examples of Java servlets are small programs written in the Java language which are added to a web server.

Web tier 308 communicates through firewall 306 to the internet using XML extendable mark up language or JSP HTML. The internet is exposed in architecture 300 at client tier 302 which includes communications using the HTTPS protocol with various client communicators 304. Examples of client communicators 304 include the palm top computer, the PDA, the personal computer using an HTML browser, a laptop computer, a smart phone, a cell phone using a Java 2 Micro Edition and enabling graphical user interfaces with MIDlets having an XML parser.

Figure 4:
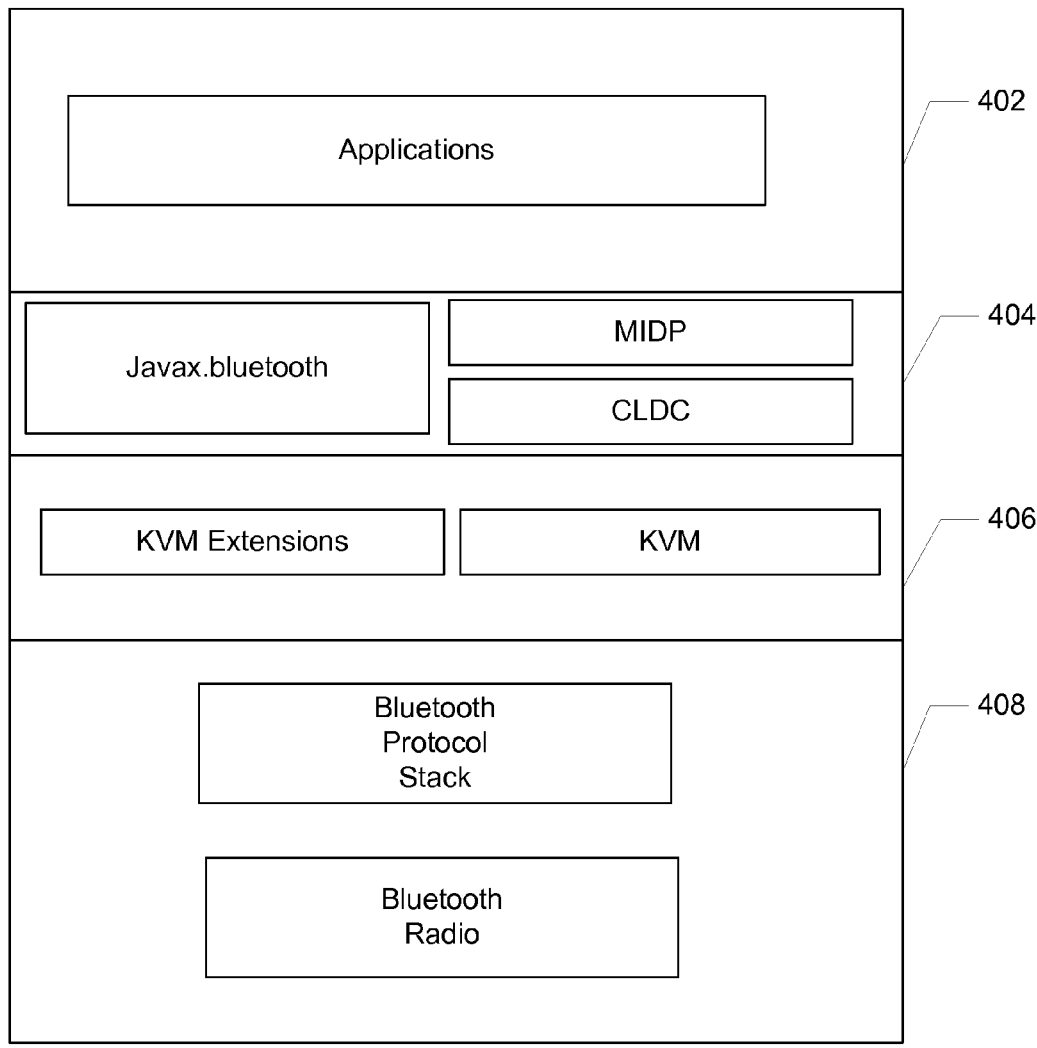
FIG. 4 illustrates an exemplary communication stack in compliance with J2ME and Bluetooth standard according to the Java Specification Request-82, the purpose of which is to standardize a set of Application Program Interfaces (APIs) to allow Java technology-enabled devices to integrate into a Bluetooth environment, where each API is independent of the stack and radio used.

FIG. 4 shows a communications protocol for a particular Java specification request (JSR) No. 82. JSR-82 is an actual description of the proposed and final specifications for the Java platform. In the JSR-82 specification 400, a collaboration between J2ME and the Bluetooth communication protocol is depicted. JR-82 400 includes a lowest layer 408 of the stack 400 which includes a blue tooth protocol stack over a Bluetooth radio.

The next highest layer 406 in the stack 400 includes a KVM and extensions thereof. The next highest layer 404 of stack 400 includes JAVX.bluetooth and a mobile information device profile (MIDP), where the MIDP is a set of Java application program interfaces that are generally implemented on the connected limited device configuration (CLDC), particularly as illustrated in layer 404 of stack 400. The highest layer 402 of stack 400 shows various applications that can be implemented using J2ME and Bluetooth. The purpose of JSR-82 is to standardize the set of APIs to allow Java technology-enabled devices to integrate into a Bluetooth environment. The highest layer 402 in the stack 400 provides APIs that are independent of the stack 400 or the radio being used.

Figure 5:
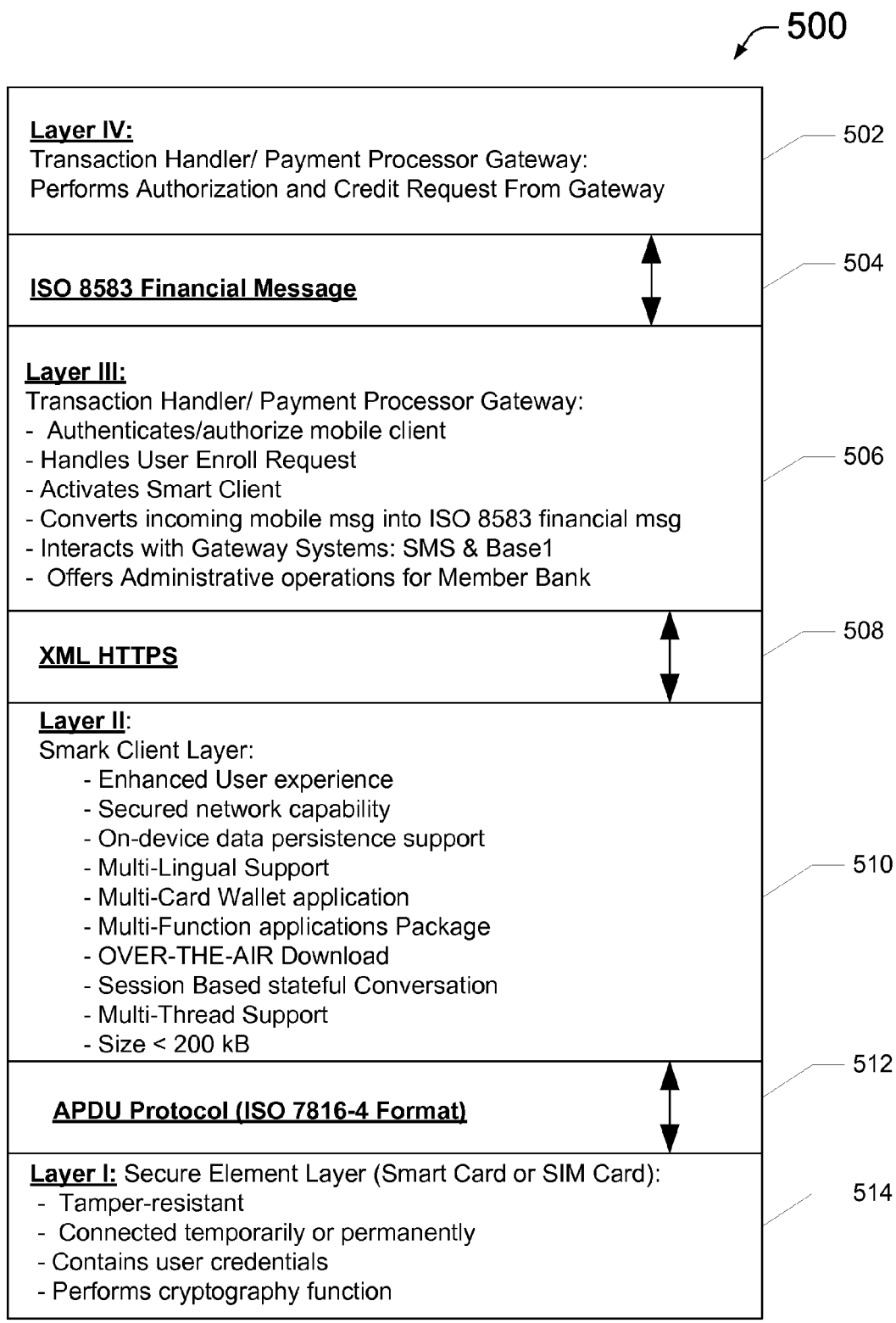
FIG. 5 is an exemplary architecture of four layers by which smart cards, SIM cards, and smart clients can communicate with a payment gateway operating in a payment processing system for the environment depicted in FIG. 1.

FIG. 5 illustrates an exemplary architecture 500 for communications of a consumer having an account issued by an issuer, where the consumer communicates with a transaction handler/processor. Architecture 500 includes four layers. Layer 514 is the lowest layer in architecture 500 and is a secure element layer for a smart card or a SIM card. Layer 514 is tamper resistant, can be connected temporarily or permanently, may contain user credentials, and may also perform a cryptography function. Layer 510 communicates with layer 1514 using an APDU protocol which is an acronym for Application Protocol Data Unit. Preferably, the APDU protocol will be in compliance with ISO 7816-4 formatting. Layer 510 is particularly relevant for a smart client layer. This smart client layer includes functionality for an enhanced user experience, as well as for a secure network capability, on-device data persistence support, the provision of multi-lingual support, the provision of multi-card wallet applications, the provision of a multi-function applications package, the provision for the facility to download various applications over-the-air, the provision of a session base stateful conversion, the provision of multi-thread support, and the provision of support for applications under 200 kB in size.

Layer 506 communicates with layer 510 using Extensible Markup Language (XML) HTTPS. Layer 506 is a gateway for a transaction handler/payment processor. As such, the gateway includes functionality for authenticating and authorizing mobile clients for transactions using account number issued by an issuer. Also provided is the ability to enroll users at their request. Layer 506 can also participate in activating smart cards, as well as converting incoming mobile messages into a standard financial message (e.g., ISO 8583 formatting). Moreover, layer 506 provides for interactions with the gateway via SMS and Base 1 financial messaging. Lastly, layer 506 offers administrative operations for member banks, including issuers and acquirers.

Layer 502 communicates with layer 506 in stack 500 through an ISO 8583 formatted financial message. Layer 502 performs gateway function for the transaction handler/payment processor. These functions include authorization and card requests in communication with the gateway. As such, the layered architecture depicted in stack 500 facilitates communications between a consumer operating a portable device capable of conducting account based transaction with a payment processor/handler via a gateway.

Figure 6:
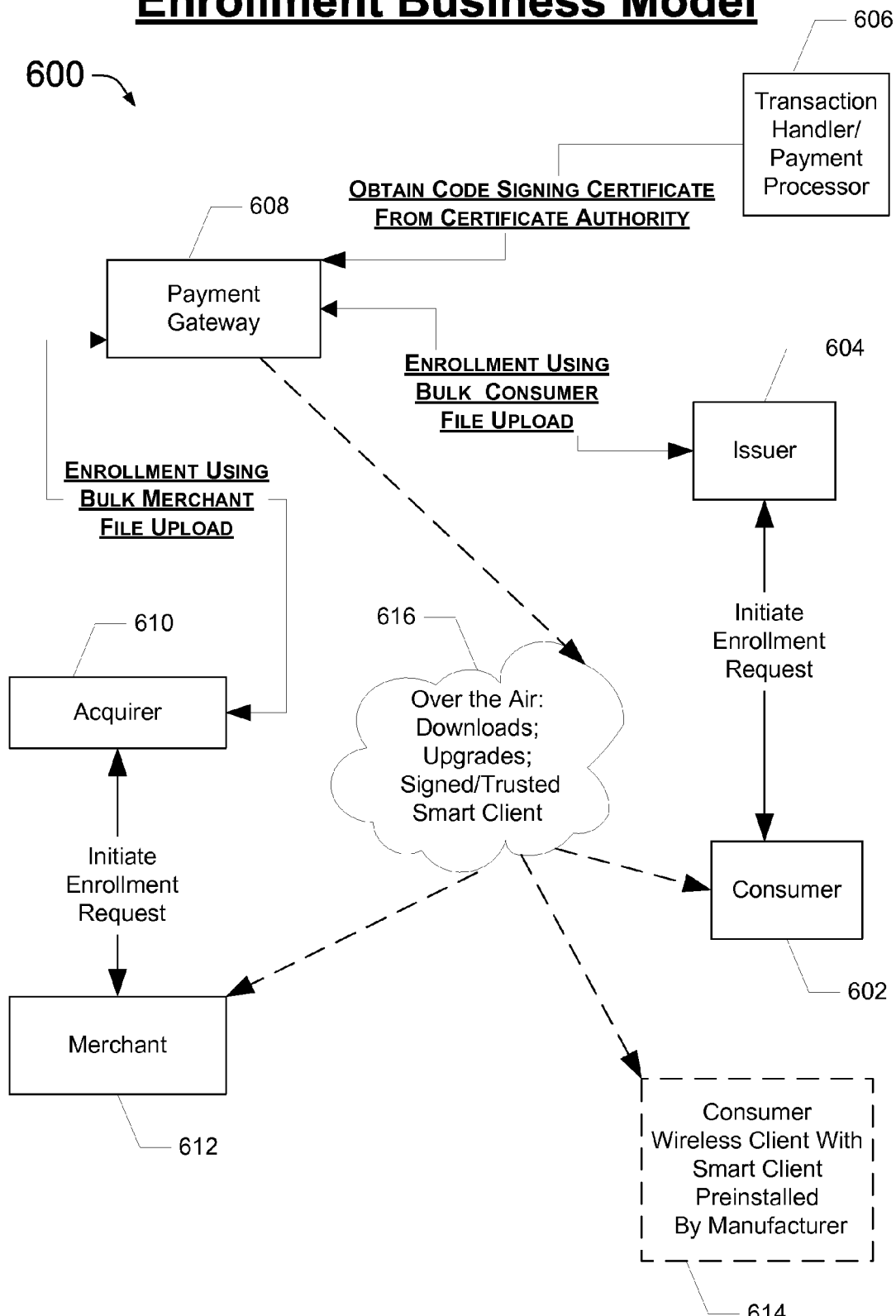
FIG. 6 is a block diagram illustrating an exemplary environment having process flow of a business model to enroll accounts respectively issued by an issuer on which wireless cashless transaction will be conducted by consumers with merchants in the environment depicted in FIG. 1.

FIG. 6 shows an exemplary model 600 for enrolling mobile devices for use in a payment processing system. In model 600, a consumer 602 has an account issued by an issuer 604. The consumer 602 can use an enrolled mobile device to conduct one or more transactions with a merchant 612. The merchant 612 submits the transaction with consumer 602 to an acquirer 610. The transaction is submitted from acquirer 610 to a transaction handler/payment processor 606. In the enrollment process of model 600, the issuer 604 initiates an enrollment request with consumer 602. The issuer 604 communicates with a payment gateway 608 to facilitate the enrollment using a bulk customer file upload of a plurality of such consumers 602. The payment gateway 608 obtains code for signing a certificate from a certificate authority in communication with the transaction handler/processor 606. The acquirer 610 communicates with payment gateway 608 for a submission of enrollment with a bulk merchant file upload, thereby initiating enrollment requests for a plurality of merchants 612.

In one implementation, consumer wireless devices with smart cards can be preinstalled by the manufacturer as shown at box 614, whereby there has been a pre-enrollment for each consumer 602 using such a consumer wireless client 612. Network communication capability is illustrated at cloud 616 showing the capability of over-the-air downloads and upgrades, as well as signed and trusted smart client capabilities. As shown, the network capability extends from cloud 616 with payment gateway 608, consumer 602, consumer wireless client 614, and merchant 612. Payment gateway 608 may be the centralized gateway that is hosted on behalf of the issuer and on behalf of the acquirer (604, 610).

Figure 7:
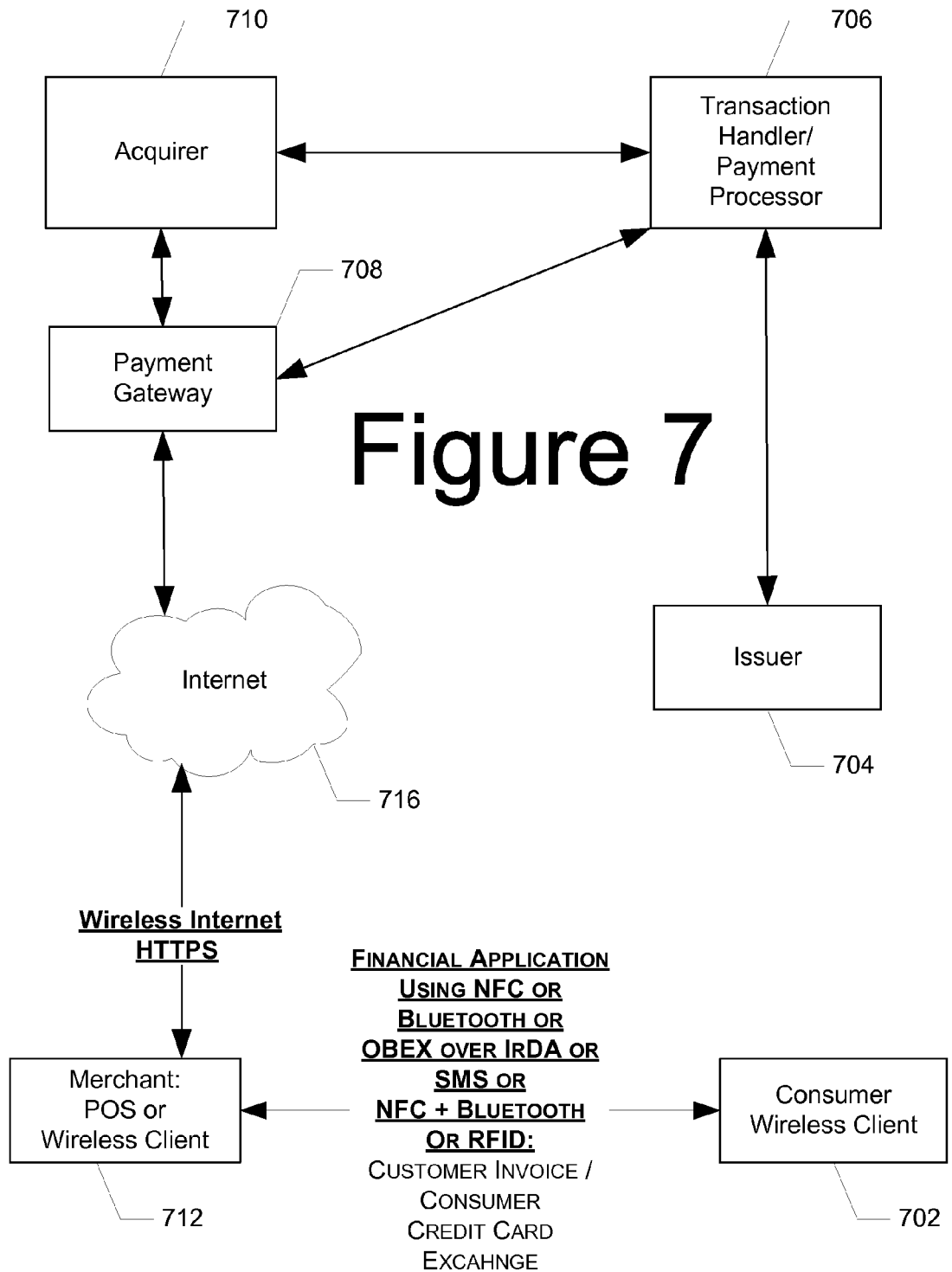
FIG. 7 is a flow chart depicting an exemplary method for a person to make a payment in a cashless transaction to a merchant using a wireless consumer electronics device.

An exemplary method 700 for a proximity payment transaction flow is illustrated in FIG. 7. In method 700, a consumer wireless client 702 does a proximity payment with merchant 712. Merchant 712 can participate in the transaction by using a point of service terminal or using a wireless client, or both. The particular communication between merchant 712 and client 702 will be through the use of a financial application. The merchant 712 can communicate by using a Near Field Communications capability (NFC) or by using Bluetooth communications. Alternatively, the merchant's 712 communication can be OBEX over IRDA, where OBEX is an object exchange, and particularly a set of high-level protocols allowing objects such as vCard contact information and vCalendar schedule entries to be exchanged using either infra-red (IRDA) or IROBEX or Bluetooth. Alternatively, the communication between merchant 712 and consumer 702 can be a short message service (SMS) or a combination of NFC and Bluetooth, or using a radio frequency identification (RFID). The financial application being conducted in the process flow of method 700 can exchange a customer invoice, or a consumer credit card for the transaction between merchant 712 and consumer 702.

Merchant 712 will communicate with the internet 717 using a wireless internet HTTPS protocol. A payment gateway 708 in communication with Internet 716 will communicate the transaction with an acquirer 710. The acquirer 710 will communicate with transaction handler/payment processor 706. In turn, transaction handler/payment processor 706 will communicate with the issuer 706 to secure payment for the proximity payment. The payment gateway 708 will preferably be implemented through the transaction handler/payment processor 706. In method 700, consumer 702 can choose a default communication protocol for this proximity payment. Advantageously, no special hardware is required by merchant 712 to conduct the proximity payment illustrated in exemplary method 700. Moreover, merchant 712 can download the particular smart client for participating in the financial transaction over the air through Internet 716.

Figure 8:
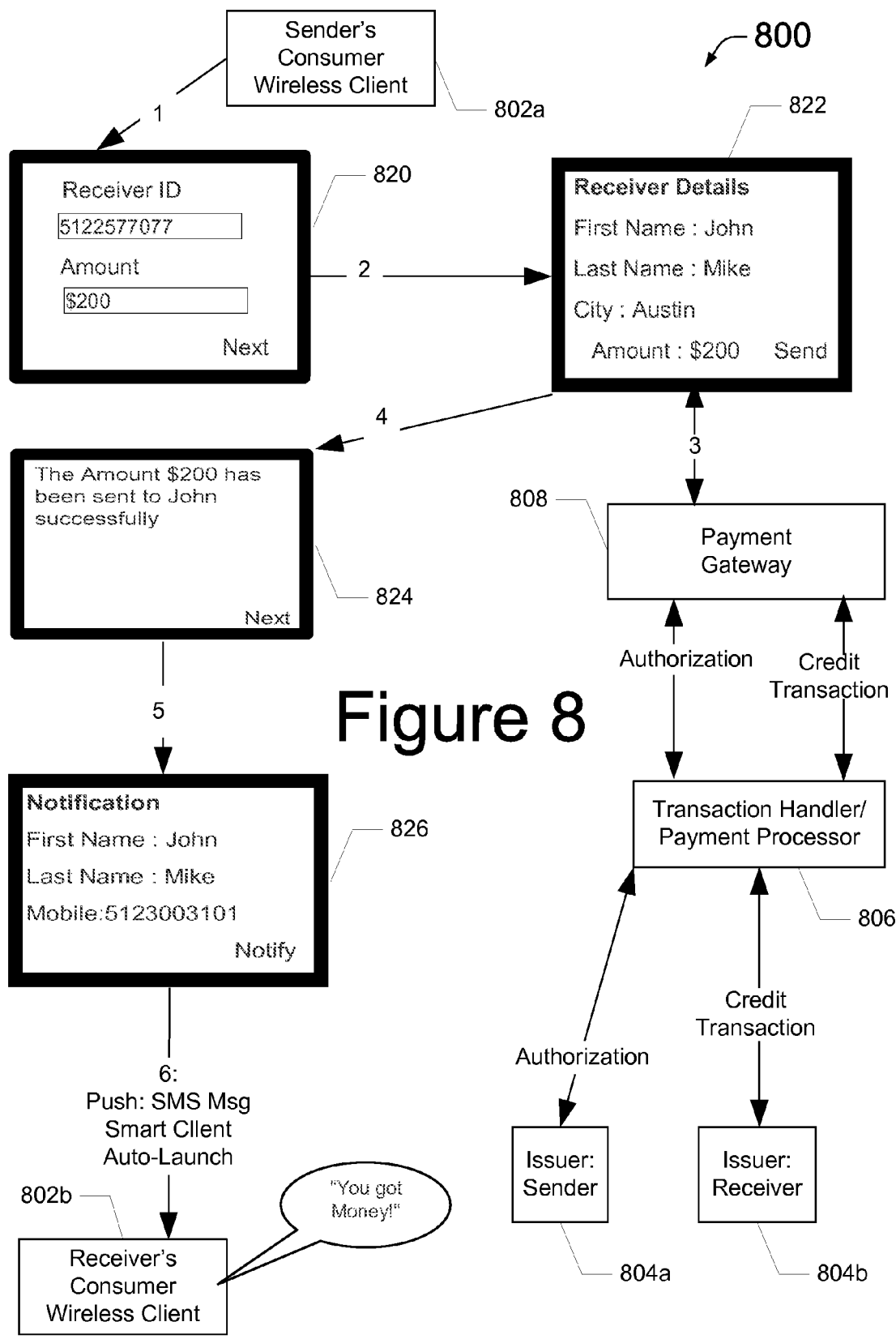
FIG. 8 is a flow chart illustrating an exemplary process flow for a person-to-person money transfer services, where a mobile consumer electronics device having wireless communications functionality is interactively used by which the transferor to move money from the transferor's account to the transferee's account.

FIG. 8 depicts a interactive method 800 by which two consumers having respective wireless clients 802A, 802B can exchange funds from one account thereof to the account of the other. Stated otherwise, method 800 is a person-to-person money transfer service.

In method 800, a sender's consumer wireless client 802a interacts with a User Interface (UI) seen at reference number 820. In UI 820, a telephone number of a telephone or cellular phone corresponding to an account that is to receive funds is input into the field labeled as "Receiver ID". The amount of funds to be transferred, here $200, is entered into the next field. The user would then select the "Next" button on UI 820 in order to proceed along flow arrow #2 to the next UI 822. UI 822 provides the details of the person to whom $200 is to be transferred. As such, UI 822 shows that "John Mike" in the city of "Austin" is to receive the $200. If the operator of wireless client 802 agrees that the information presented in UI 822 is correct, then the operator activates the "Send" button and the cellular telephone hen begins a dialogue through process flow 300 with a payment gateway 808. Payment gateway 808 secures an authorization through a transaction handler/payment processor 806 as well as communicates various credit transactions with transaction handler/payment processor 808.

Transaction handler/payment processor 806 corresponds with the issuing bank of the consumer by sending a request to make a payment where that issuer bank is seen at reference numeral 804a. The particular communication between processor 806 and the issuing bank 804a is for authorization of a peer to peer payment or a person to person payment. Transaction handler/payment processor 806 corresponds with the receiving bank who is the issuer for the consumer who is to receive funds and is seen at reference numeral 804b. In particular, transaction handler/payment processor 806 will credit the account of the consumer who is to receive funds via a credit transaction to issuer: Receiver 804b.

The issuer bank 804b corresponds to the consumer wireless client 802b. In turn, the issuing bank 804a corresponds to the consumer wireless client 802a. As such, issuer 804a is the issuer of the account for the consumer that is operating the cell phone 802a, whereas the issuer 804b issues the account to the consumer who is operating cell phone 802b.

Once the operator of cellular telephone 802a confirms information received on UI 822 by operating the "Send" button, method 800 moves through process flow 3 for communication with payment gateway 808 as discussed above. Thereafter, method 800 moves through process flow #4 to UI 824. At UI 824, a confirmation is rendered on the cell phone 802a to the effect that "the amount $200 has been sent to John successfully."Following this diagnostic rendering on UI 824, the operator of cell phone 802a can operate the "Next" button on UI 824 to move method 800 through process flow #5 to UI 826. UI 826 provides a notification rendering to be displayed on cell phone 802b (the receiver's consumer wireless client). This rendering on UI 826 is "Notification: First Name: John, Last Name: Mike, Mobile: 512-003-101". If the cell phone 802a is to be used by the consumer to send this notification to the person who has received funds, then the operator of cell phone 802a will operate the "Notified" button UI 826. Thereafter, process flow $6 will be activated in method 800.

Process flow $6 in method 800 shows that there will be a 'push' MSM message via the smart client which will auto launch a rendering on the receiver's cell phone 802b. The rendering on cell phone 802b can be, for example, an audible phrase such as "You've Got Money!" Stated otherwise, the receiver's consumer wireless client 802b will have an auto launch rendering on the smart client application running on cell phone 802b which will allow the user of the cellular telephone to be notified of the arrival of under by audibly hearing the phrase "You've Got Money!" rendered by cell phone 802b.

Person to person payment seen in method 800 of FIG. 8 allows the payment gateway 808 to communicate with the bank that issued an account to the consumer who will be receiving funds, particularly issuer bank 804b which corresponds to the receiver's consumer wireless client 802b. The consumer having the account issued by issuer 804b can have their funds loaded instantly. This instantaneously loading of received funds from one account into another account can be accomplished through a web service that might use a protocol such as HTTPS/SOAP.

Figure 9:
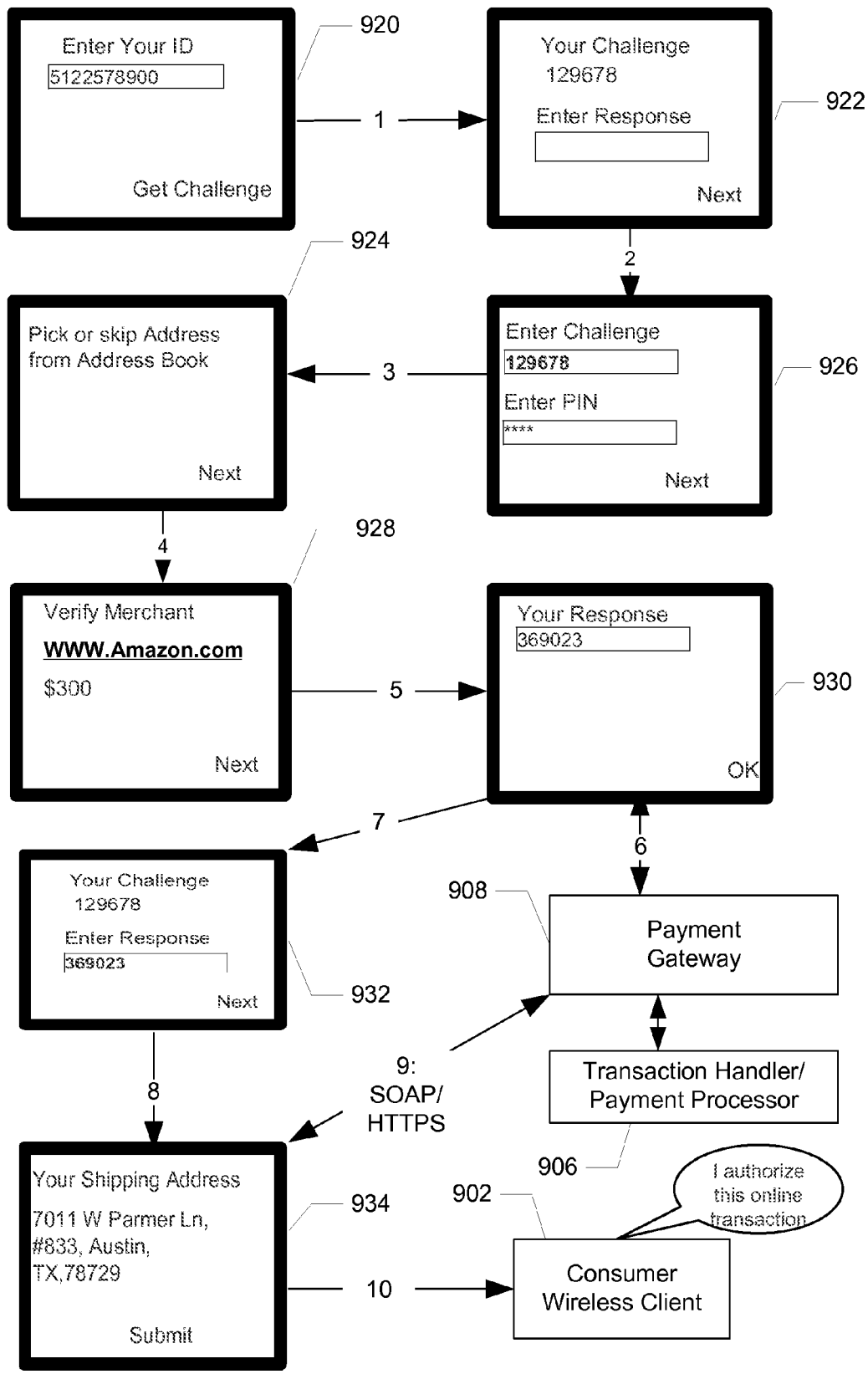
FIG. 9 is a flow chart depicting an exemplary method for a person to make a purchase from a merchant through its Internet e-commerce Web service in a cashless transaction by interactive use of a wireless consumer electronics device.

FIG. 9 shows an exemplary method 900 for making a purchase at an online e-commerce web service using a mobile wireless client 902. Method 900 illustrates a series of chronologically situated user interface (UI) displays on consumer wireless client 902. A consumer operates wireless client 902 for each UI seen in method 900 in order to conduct a transaction with the online merchant through their web services e-commerce application.

Method 900 begins with UI 920 in which a consumer enters a telephone number into a field on UI 920. In this case, the telephone number being entered is the phone number of the consumer wireless client 902. Thereafter, the consumer operates the button "Get Challenge" on UI 920 to move through process flow #1 to UI 922.

In UI 922, a challenge number is displayed on the display screen of UI 922. The consumer is expected to enter a response to the challenge in the open field seen in UI 922. The consumer uses the key pad of their cellular phone 902 to enter the response and then activates the "Next" button on UI 922.

Process flow number #2 in FIG. 9 takes method 900 to UI 926 at which a challenge number is entered by the consumer operating the consumer wireless client 902. Also, a personal identification number (PIN) is entered by the cell phone 902 on UI 926. Thereafter, the consumer operates the button "Next" in UI 926 to take method 900 on process flow #3 to UI 924.

UI 924 allows the consumer to pick a particular internet address of an e-commerce Website of an 'on-line' merchant with whom, and at which, a transaction is to be conducted. This step, for UI 924, however is optional, and the user moves from UI 926 by activating the button "Next" to move from UI 924 through process flow #4 to UI 928.

UI 928 shows a rendering on cell phone 902 that depicts the selected address that of the on-line merchant "www.Amazon.com", at which a purchase is sought in the amount of $300 from this merchant by the consumer operating cell phone 902. To confirm this transaction, and the amount thereof, with this merchant, the consumer activates the button "Next" on UI 928 to move method 900 through process flow #5 to UI 930.

At UI 930, the consumer enters a response to confirm that the purchase is to be completed or otherwise finalized. This purchase is then confirmed on UI 930 via a confirmation code seen in UI 930 as "369023" in a data entry field. To confirm this data entry, the consumer activates the button "OK" on UI 930.

Following the entry of the response code in the data entry field on UI 930, method 900 moves through process flow #6 to payment gateway 908. Payment gateway 908 interacts with transaction handler/payment processor 906 before method 900 proceeds to process flow #7.

After process flow #7, UI 932 is displayed on cell phone 902. UI 932 displays "Your Challenge" as "12962A". To this challenge, the consumer is expected to enter a response via a data entry field on UI 932. The enter made into the data entry field shown on UI 932 is "369023". To confirm this data entry on UI 932, the consumer operates the button "Next" to move through process flow #8 to UI 934. At UI 934, the consumer can select the shipping address to which the purchase made at the merchant "www.Amazon.com" is to be shipped. Here, UI 934 shows that the shipping address is "7011 W Parmer Ln, #833, Austin, Tex. 78729." If this shipping address displayed on UI 934 is correct, then the consumer selects the button "Submit" to move method 900 along process flow #10 which indicated the interaction with consumer wireless client 902. There is an interaction between UI 934 and payment gateway 908 as well as transaction handler/payment processor 906. The interaction between UI 934 of cell phone 902 and payment gateway 908 will preferably be in the protocol of SOAP/HTTPS as seen in process flow #9.

Following UI 934, process flow #10 may invoke an audible rendering on consumer wireless client 902 of the audible phrase "I authorize this online transaction" to signify to the hearer that the transaction has been authorized with the merchant by the consumer and the transaction is confirmed. As such, method 900 is an exemplary implementation of a consumer operating a cell phone to conduct an online purchase with an online merchant where the purchase is a non-cash transaction conducted upon an account issued to the consumer by its issuer with an online merchant.

Method 900 seen in FIG. 9 advantageously provides the on-line merchant with the benefit of a payment gateway that authenticates the consumer's cell phone, thus likely incurring low liability or exposure from the transaction processor/handler 908 within the payment processing system. The consumer receives the benefit in that they need not give a credit card number to a merchant, and the benefit of a fast checkout when making such online purchases which speed is enable by access to an address book for the merchant as well as for the consumer's shipping address. As can be seen in method 900, there is a two factor authentication including both the user's personal identification number (PIN) as well as the authentication through the mobile device operated by the consumer (see consumer wireless client 902). Optionally, method 900 can incorporate a digital signature using a cryptic graphic feature.

Figure 10:
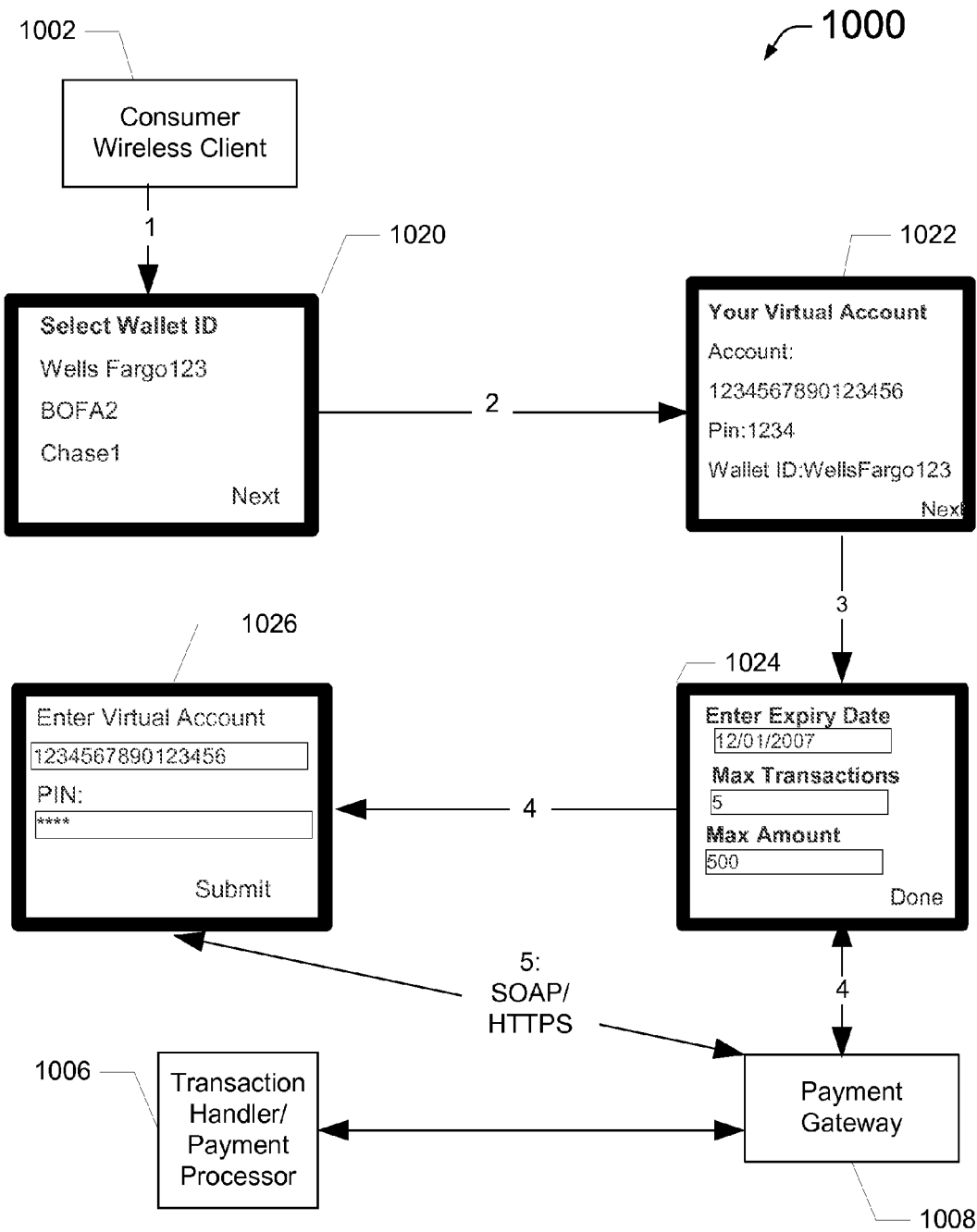
FIG. 10 is a flow chart depicting an exemplary method for a consumer to manage an account issued by an issuer to the consumer by interactive use of a wireless consumer electronics device.

FIG. 10 shows a method 1000 in which a consumer can operate a cell phone or other mobile communicator to manage their accounts issued to them by issuing banks. Seen from FIG. 10, a consumer wireless client 1002 moves through a process flow #1 of method 1000 to a user interface 1020. UI 1020 shows the display that permits the consumer operating cell phone 1002 to select one of three different accounts that are rendered on UI 1020. As seen in FIG. 10, UI 1020 shows the first account as being "Wells Fargo 123", the second account as being "BOFA2", and third account as being "Chase1". As those of ordinary skill in the relevant arts will understand, the three accounts listed on UI 1020 are identifiers known possibly only to the consumer for the particular account numbers and the corresponding issuer thereof to the consumer.

The selection of the "Next" button on UI 1020 moves method 1000 through process flow #2 to US 1022. UI 1022 displays the relevant information about the account selected in UI 1020. As seen in FIG. 10, UI 1022 lists the virtual account number as being 1234567890123456, the corresponding PIN for that account being "1234", and the wallet ID being the selected count which is "Wells Fargo 123" as seen from the selections available in UI 1020. Following the visual confirmation to the consumer at UI 1022, consumer can operate the "Next" button on UI 1022 such that process 1000 moves along process flow #3 such that UI 1024 is displayed upon cell phone 1002. UI 1024 allows the consumer to enter three different data fields.

The first data field on UI 1024 is the date of expiration of transactions that are to be conducted on the selected account using the virtual account number. As seen in UI 1024, the first field data entry is Dec. 1, 2007. The second data entry field is the number of transactions that can be conducted between the present date and the expiration date on the selected account using the virtual account number. Here UI 1024 shows a maximum of five transactions have been entered by the consumer. The last field is the maximum amount of each transaction which is to be permitted on the selected account using the virtual account number. As seen in UI 1024 this amount is $500. Following the data entry of these different fields, the consumer activates button "Done" on UI 1026. Upon such activation, method 1000 moves along process flow #4 to display UI 1026 upon cell phone 1002.

UI 1026 permits the consumer to enter their virtual account number and a PIN previously displayed in UI 1022. Following the entry of these data into the two data entry field on UI 1026, the user operates button "Submit" to move method 1000 along process flow #5e seen in FIG. 10.

Process flow #5 seen in FIG. 10 involves interaction between the cell phone 1002 and a payment gateway 1008 of a transaction handler/payment processor 1006. The communication between cell phone 1002 and the payment gateway 1008 can use a variety of communication protocols. Preferably, the communication protocol will be "SOAP/HTTPS".

Method 1000 seen in FIG. 10 is advantageous in that an account can be managed by a consumer without ever having to give a credit card number to any merchant, be they a merchant contacted by the consumer online or contacted by the consumer by telephone. Moreover, a consumer can change the temporary virtual account number readily. Here, the virtual account number will be a number that temporarily corresponds to the actual account number that the consumer was issued by an issuer. The changes that can be made to the virtual account include the expiration date of that account, the number of the transactions that the consumer will permitted to be conducted by the consumer with that temporarily account number, the merchants that the consumer will not be permitted to transact with using that temporary account, etc. As such, the consumer can prevent many unauthorized uses of their real account with merchants, can prevent transactions having a currency amount above a consumer-set limit, can prevent transactions beyond a given date, beyond a given consumer-set number of transactions, as well as numerous other possibilities that are known to those of ordinary skill in the art though not necessarily seen in FIG. 10.

Figure 11:
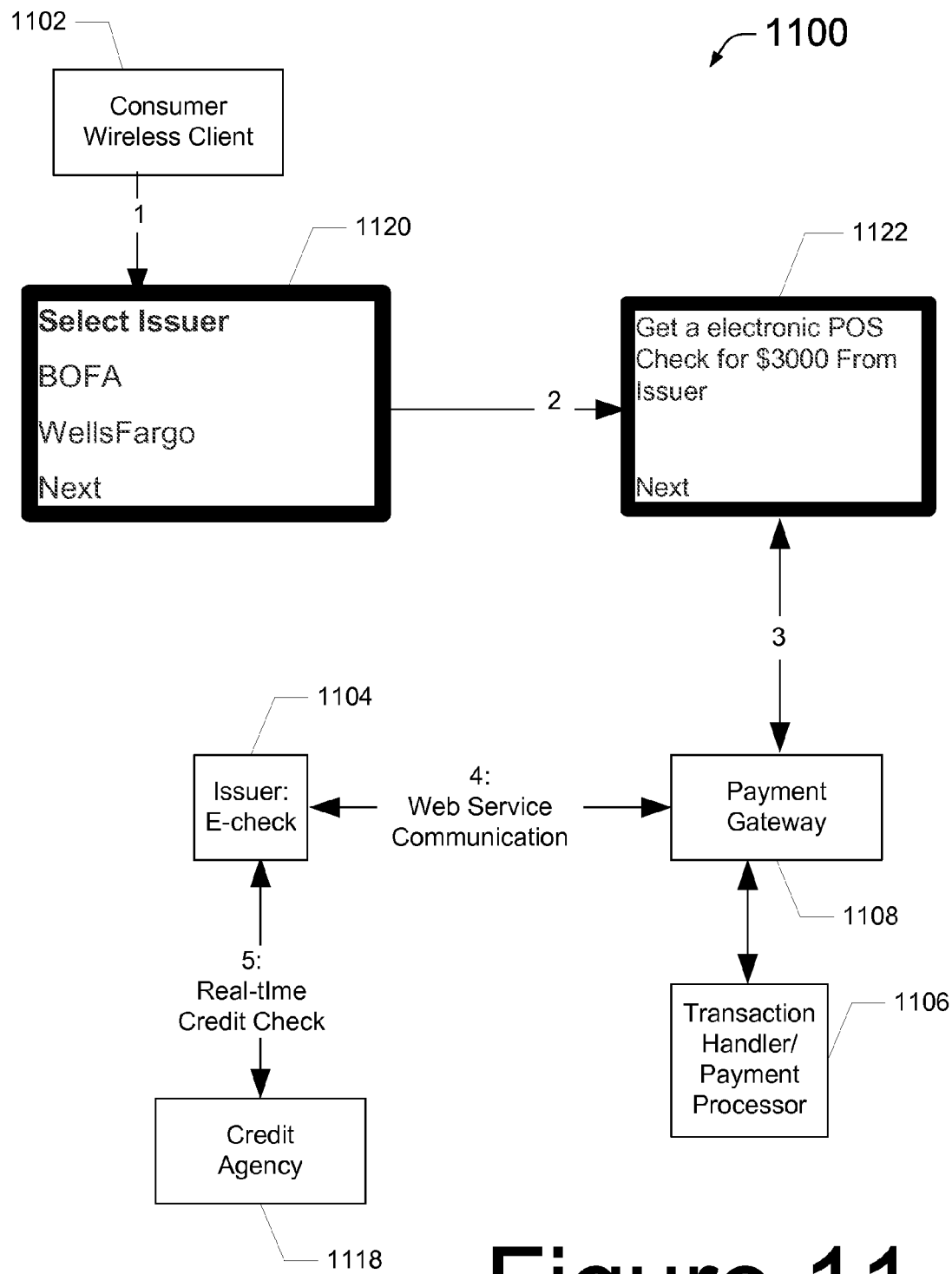
FIG. 11 is a flow chart depicting an exemplary method for a borrower to apply for a loan from a lender to make purchase on an account issued by the lender, where the borrower applies for the loan from the lender by interactive use of a wireless consumer electronics device.

FIG. 11 shows an exemplary method 1100 in which a cell phone can be used to initiate a loan from a lender. The cell phone is operated by a consumer who interacts with a lender to obtain a loan that will be used to purchase the good or service from a merchant. Method 1100 begins when a consumer operates a wireless client 1102 to execute an application that displays the user interface 1120. UI 1102 renders two different institutions from which a loan can be secured. These institutions seen in UI 1120 include issuer "BOFA", and another issuer "Wells Fargo". Each issuer can issue a loan account number to the consumer that is operating consumer wireless client 1102. Following the selection of a particular lender by the consumer in UI 1120, the user operates the "next" button such that method 1100 moves along process flow #2 to render a UI 1122 on consumer wireless client 1102.

UI 1122 displays "Get an electronic POS check for $3,000 from issuer". As such, the consumer is being offered a loan of $3,000 from the issuer that was selected on UI 1120. If the particular loan being offered on UI 1122 to the consumer is acceptable, the user operates the "Next" button to accept the loan. By way of example, and not by of limitation, the loan can be a for a purchase made on credit terms of 'zero money down, zero interest' where the loan is for an 'easy' installment service. This service is giving the consumer the power to make an instant high ticket online or point of sale transaction by the use of the loan. Such a transaction may be desirable where the expense is a large and perhaps unexpected such that the consumer must take a loan. The merchant is able to offer this loan to the consumer with the hope that they'll make the purchase a credit enticement of not having to put any money down towards the purchase, and perhaps also offering a favorable interest rate of no interest being charged on the loan if the consumer pays off the loan within 90 days of the purchase. Moreover, the merchant can allow the consumer to convert this installment credit account transaction to a real credit card transaction also by using their mobile phone. For instance the transfer to the credit card might further allow the interest rate incentive to the consumer by the merchant providing that the transaction can be made to the consumer with no interest being charged for up to one year following the date of the transaction. Thus, the consumer can receive delivery of goods or services from the merchant, and the merchant can bill the consumer later for the transaction, where the transaction charges will not incur a charge for interest on the loaned money for up to a year after the transaction in this scenario.

Acceptance of the proposed loan by the consumer at UI 1122 initiates an interaction between consumer wireless client 1002 and payment gateway 1108. Payment gateway 1108 is in communication with transaction handler/payment processor 1106. In this interaction between gateway 1108 and processor 1106, a web service communication takes place in process flow #4 with an issuer of the loan, which is seen in FIG. 11 at reference number 1104. Here, the issuer 1104 is the institution that will issue a loan to the consumer in the form of an electronic check (E-check). Prior to making the loan, the issuer 1104 may want to conduct a credit check on the consumer with a credit agency 1118 through process flow #5 seen in FIG. 11. Process flow #5 can be a real time credit check on the consumer. Thus, an instantaneous loan can be accomplished by the consumer operating their cell phone. The financial institution, as the issuer 1104, has reduced their exposure of making a bad loan that is likely not to be repaid by performing a real time credit check in process flow #5 with credit agency 1118.

Figure 12:
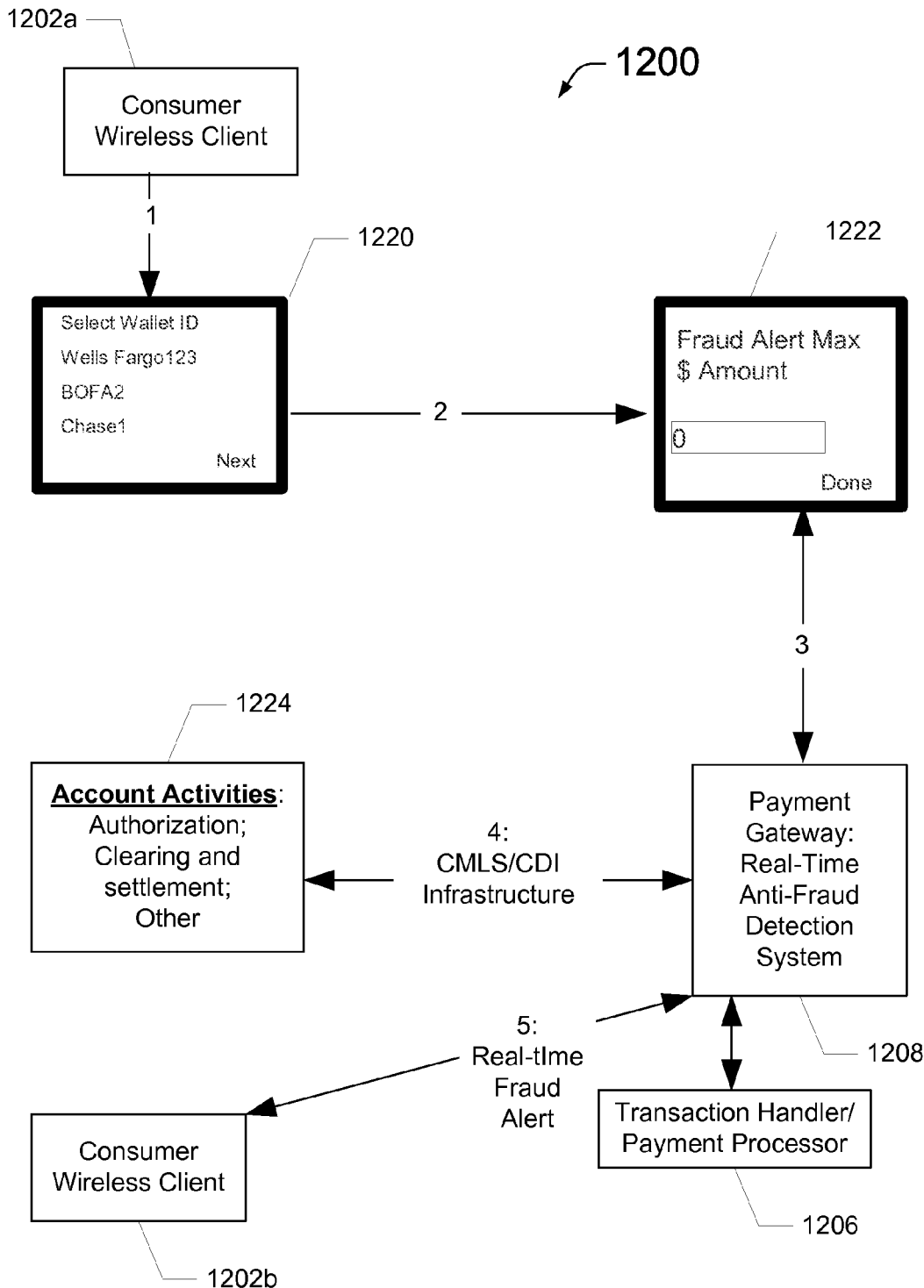
FIG. 12 is a flow chart depicting an exemplary method for a consumer to receive a real-time notification about a potential incidence of fraud incident to a transaction conduct on an account issued by an issuer to the consumer, where the consumer requests the notification by interactive use of a wireless consumer electronics device to which the notification can be delivered.

FIG. 12 shows a process 1200 that allows a consumer and operator of a mobile phone to be notified if fraud is being conducted using an account issued to the consumer. As seen in FIG. 12, a consumer wireless client 1202a through process flow #1 has a display rendered on their cell phone seen as user interface 1220. UI 1220 shows a display of particular accounts that can be selected by the consumer for which fraud notifications are desired to be received by the consumer on their cell phone 1202a. UI 1220 shows identifiers for three different accounts from which the consumer can select. These accounts, indicated by cryptic identifiers, include "Wells Fargo 123", "BOFA2", and the account "Chase1". Following the consumer's selection of one of the three different account identifiers, the consumer selects the "Next" function on UI 1220.

UI 1222 allows data entry by the consumer of the amount of money that will trip an alert being sent to the cell phone 1202a if a transaction is conducted over that amount. For instance, the consumer may wish to be notified if any transaction on their account is being made that exceeds $2500. If so, then the consumer will use the keyboard on their cell phone 1202a to enter the number 2500 in the data entry field seen in UI 1222. Once the proper amount of money has been entered in the data entry field on UI 1222, a consumer could activate the "Done" button on UI 1222. Thereafter, the activation will cause method 1200 to move to process flow #3 to interact with a payment gateway 1208.

The payment gateway 1208 provides the functionality for a real time anti-fraud detection system. The anti-fraud detection system operated by payment gateway 1208 involves the communication with a transaction handler/payment processor 1206. Payment gateway 1208 also interacts with process flow #4 seen in method 1200. Process flow number four involves a communication infrastructure that permits various activities to be monitored for the corresponding account selected by the consumer at UI 1220. These account activities include authorization of transactions on the account, clearing and settlement of transaction on the account, and other typical and specific financial services related actions that can be conducted on the account selected by the consumer at UI 1220.

Process flow #4 illustrates two different aspects of the infrastructure that allows account activities to be monitored by payment gateway 1208. These infrastructure components include a Consolidated Master Log Services (CMLS) and a Common Data Interface (CDI). The CMLS reads data from a variety of sources and applies specific cleansing rules. The Cleansed data is then delivered to the customer in any variety of formats (flat file, data base, etc.). The focus of CMLS is to give the customer application data in a requested form, when they want it, with appropriate transformation rules applied. The CDI component of the infrastructure is for the transformation aggregation and load authorizations, draft, fraud transaction detail, and entry into a relational data base that provides back-end server data preparation for decisions for clients who use COGNOS and micro strategy. Process of transforming, aggregating and loading the data is known as CDI bill. The data base that stores the data is known as the CDI warehouse. Those of ordinary skill in the art in the payment processing industry will readily recognize the CDI and CMLS infrastructure as enabled here.

If the particular fraud alert being sought by the consumer was entered in UI 1222 or other such UIs specifying other fraud alert parameters, then process flow #5 seen method 1200 will allow a real time fraud alert to be sent to the consumer wireless client 1202b. Consumer wireless client 1202a need not be the same mobile phone or other wireless mobile communicator as consumer wireless client 1202b. Nevertheless, method 1200 seen in FIG. 12 allows a consumer to specify when and how they would like to be notified that fraud is being conducted on an account issued by an issuer to the consumer. These notifications can be sent to the consumer's cell phone in real time and in a variety of formats concluding SMS message, where that SMS message will launch a particular applet or moblet on a consumer's cell phone automatically, thereby allowing the consumer to receive a general fraud alert in real time with the occurrence of the fraudulent transaction.

Figure 13:
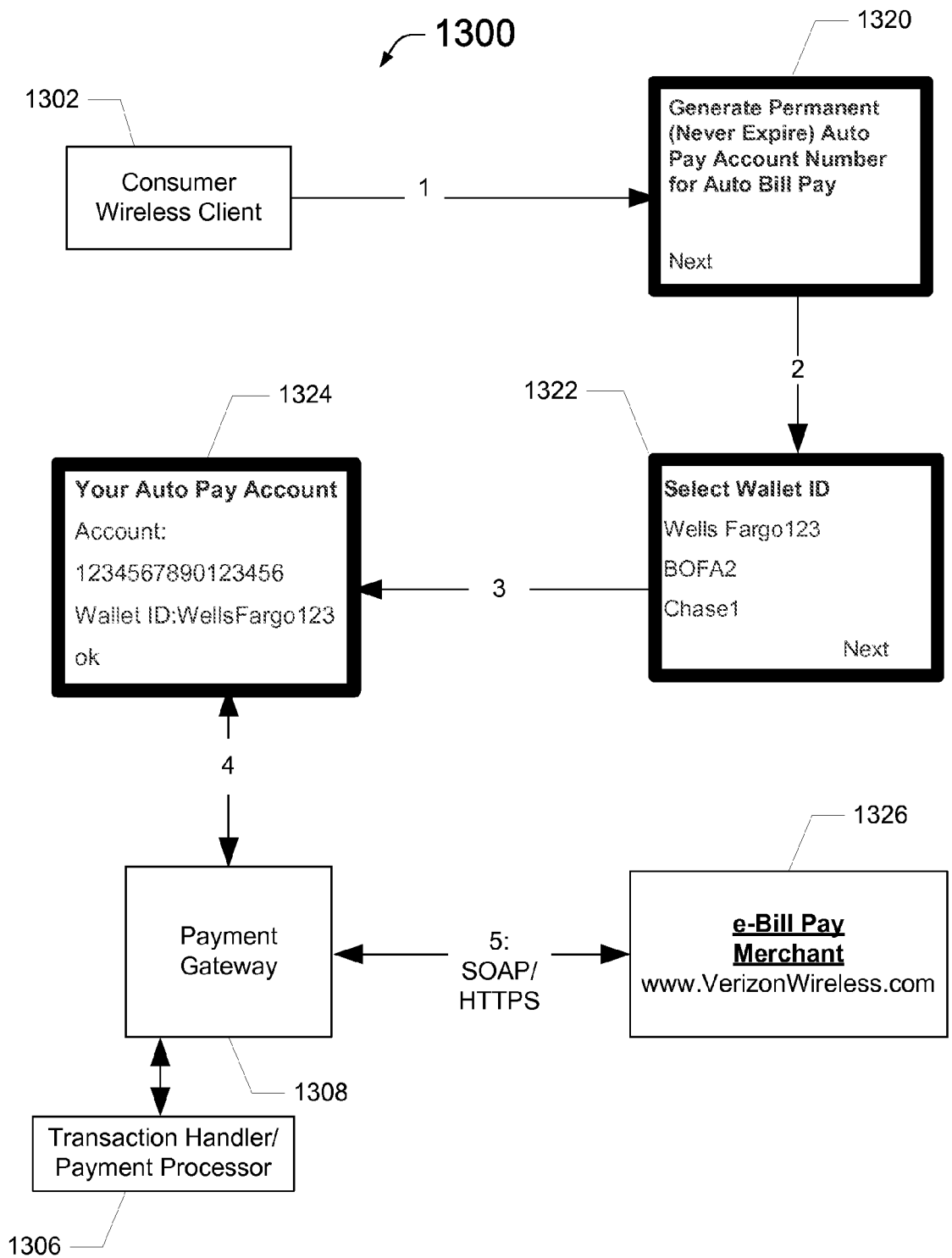
FIG. 13 is a flow chart illustrating an exemplary method for a consumer to arrange for automatic payments to be made to an account issued to the consumer by an issuer, where a mobile consumer electronics device having wireless communications functionality is interactively used by the consumer to make the arrangement.

FIG. 13 shows an exemplary method 1300 that allows a user to operate their cell phone to automatically pay bills after an initial set up. As seen in FIG. 13, a consumer wireless client 1302 (e.g., cell phone) is operated by a consumer along process flow #1 such that the cell phone 1302 displays user interface 1320. UI 1320 displays the text "Generate permanent (never expire) automatic pay account number for auto bill pay" as a description of the function that is to be accomplished by the consumer using their cell phone 1302. If this is acceptable, then the consumer will activate the "Next" button on UI 1320. Upon such activation, method 1300 moves along process flow #2 to UI 1322. UI 1322 allows the consumer to select one of three different accounts, rendered by way of their respective identifiers, that the consumer wishes to use to indicate that a payment is to be made automatically to that account. Upon a selection of one of the three different account identifiers at UI 1322, the consumer activates the "Next" button. Upon such activation, method 1300 moves along process flow #3 to allow the cell phone 1302 to render UI 1324.

UI 1324 shows a confirmation of the particulars of the account selected by the consumer at UI 1322. The particular account seen in UI 1324 is via the rendering of "Your auto pay account: account: 123456780123456; wallet id: Wells Fargo 123". As can be seen from UI 1234, the account identifier "Wells Fargo 123" was selected by the consumer at UI 1322. Following the selection of the account at UI 1322, and the confirmation of the selected account at UI 1324, then the user can activate the button "ok" on UI 1234. Upon such activation, method 1300 moves along process flow #4 to interact the cell phone 1302 with payment gateway 1308.

Payment gateway 1308 interacts with transaction handler/payment processor 1306 to facilitate the automatic payment transaction with the merchant desired by the consumer who operates cell phone 1302. Payment gateway 1308 communicates the process flow #5 seen in FIG. 13 with a merchant 1326. In particular, merchant 1326 can be an electronic bill payment merchant who accepts electronic payment for amounts due on an account corresponding to the consumer that is operating consumer wireless client 1302. As seen in FIG. 13, the particular merchant that is to be automatically paid is "www.verizonwireless.com". Communication between merchant 1326 and payment gateway 1308 will preferably be in a communication protocol of "SOAP/HTTPS", which may be desirable for reason of security and integrity. As such, method 1300 allows a consumer to change their association between automatic bill payments and the real credit card number or debit card number that they are using to make such payments. Also, the consumer can get an alert ahead of time if the card number issued to them by an issuer that they intend to use to pay a bill is soon to expire. The consumer can also get alerts if there has been an error as to any automatic payment that they wish to make. After initial setup, payment gateway 1308 can periodically make automatic payments of amounts owed to merchant 1326 using the account designated by the consumer at UI 1322. As such, the consumer need not periodically attend to manual paying of bills as a periodic chore, but rather can allow payment gateway 1308 to automatically pay different merchants after the set up seen in method 1300.

Figure 14:
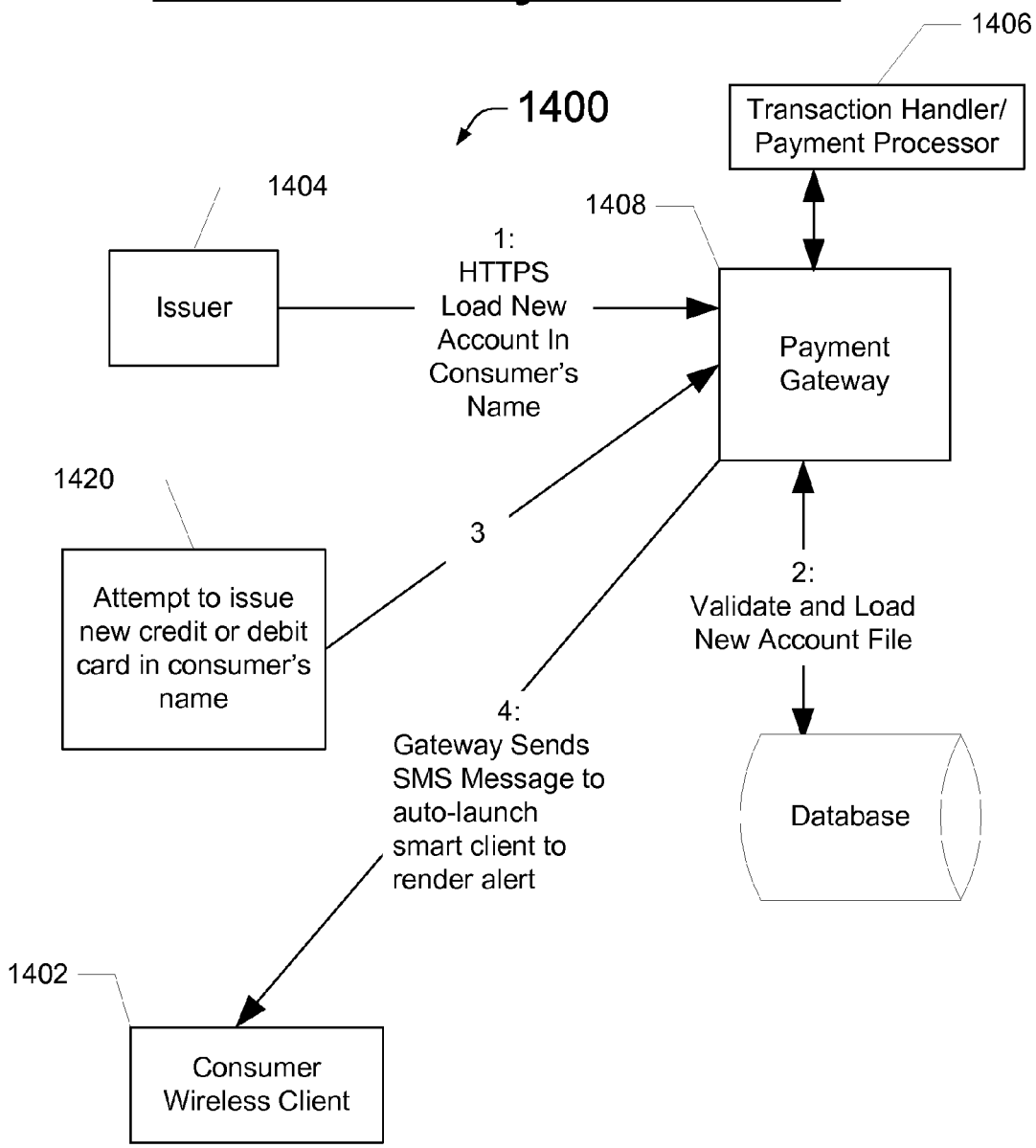
FIG. 14 is a flow chart depicting an exemplary method for a consumer to receive a real-time notification about a potential incidence of a theft of the consumer's identity, such as an attempt to open an account in the name of the consumer, where the consumer requests the notification by interactive use of a wireless consumer electronics device to which the notification can be delivered.

FIG. 14 shows an exemplary method 1400 that permits the operating of consumer wireless client 1402 to receive notification when an attempt is made to steal the identity of a consumer. Various parties involved in the alerting of such identity theft are seen in FIG. 14 as consumer operating a consumer wireless client 1402, an issuer 1404 that issued an account to the consumer who operates consumer wireless client 1402, and a transaction handler/payment processor 1406 who processes transactions conducted on the account issued by issuer 1404 to the consumer who operates consumer wireless client 1402. A payment gateway 1408 is in communication with the transaction handler/payment processor 1406. Communications are had between payment gateway 1408 and issuer 1404 through process flow #1 seen in FIG. 14. Process flow #1 allows the issuer 1404 to load each account that's assigned to the particular consumer through an HTTPS communication with payment gateway 1408. Thereafter, payment gateway 1408 will have a list of all accounts that are to be monitored for potential identity theft. Through process flow #2 seen in FIG. 14, payment gateway 1408 validates and loads new account files into a data base seen in FIG. 14. Following the loading of accounts into the database in communication with payment gateway 1408, process 1420 indicates the occurrence of a condition that an attempt has been made to use a new credit or debit card in the consumer's name, which use constitutes identity theft. This identity of theft attempt is seen in process flow #3 in FIG. 14 as a communication with payment gateway 1408. Once such an attempt has been made, payment gateway 1408 sends a notification to the consumer wireless client 1402. Such a notification to consumer wireless client 1402 can be via a SMS message to the cell phone 1402. Upon receipt of the SMS message by cell phone 1402, an applet or moblet can be automatically launched upon the smart client executing on mobile phone 1402. This smart client will render on cell phone 1402 the alert announcing that there has been attempt to steal the identity of the consumer who has the account issued to them by the issuer 1404. Thus, the operator of the mobile phone 1402 can receive an alert as to identification theft anywhere they are located within cell phone range as long as is activated. By way of example, and not by way of limitation, the consumer will receive a notification on their cell phone whenever anyone attempts to open a debit or credit account in the consumer's name such that account would be issued on behalf of that consumer. Once the consumer receives the alert, the consumer can operate their cell phone to call the transaction handler/payment processor 1406 and/or the issuer 1404 to assist in stopping the theft of the identity of the consumer.

Figure 15:
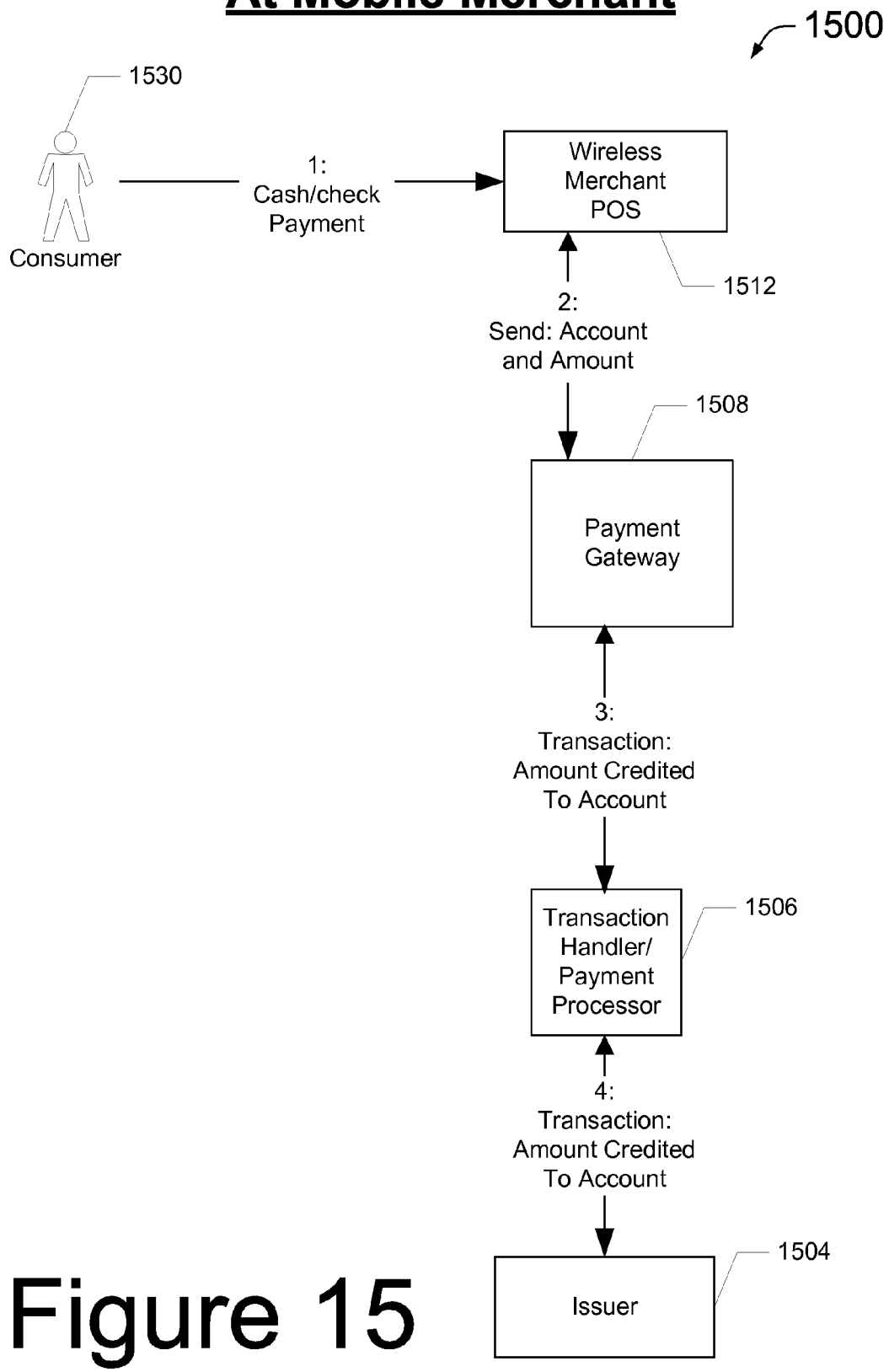
FIG. 15 is a flow chart illustrating an exemplary method for a consumer to pay a merchant to add money to an account issued to the consumer by an issuer, where the merchant can use a mobile consumer electronics device having wireless communications functionality to add the consumer's money to the consumer's account.

FIG. 15 shows an exemplary method 1500 by which a consumer can add funds to an account issued to them by an issuer by the consumer's use of their cell phone or other mobile communication device. As seen in method 1500, a consumer 1530 tenders cash or a check as a payment seen in process flow #1 to a merchant 1502. The merchant can be a mobile merchant, such as a taxi cab, a mobile cafeteria, or any merchant wishing to be in communication with a financial institution via a wireless connection. For instance, the merchant may operate a point of service terminal (POS) that wirelessly communicates with a payment gateway 1508 seen in FIG. 15. Such communication would take place wirelessly through process flow #2. In process flow #2 seen in FIG. 15, the amount of money that the consumer 1530 wishes to add to their account would be sent to payment gateway 1508 through a wireless connection with merchant 1512. Payment gateway 1508 would interact with transaction handler/payment processor 1506 through process flow #3 seen in FIG. 15. Process flow #3 would allow the amount paid at process flow #1 to be credited to the account of consumer 1530. In order to get the amount paid at process flow #1 credited to the account of consumer 1530, transaction handler/payment processor 1506 interacts with issuer 1504. Here, issuer 1504 issued the account to consumer 1530 to which the payment made in process #1 is to be credited or deposited Thus, a consumer can give a merchant money in the form of cash or a check and have that money credited, deposited or otherwise added to the consumer's account that had been issued to the consumer by their issuer. To do so, the merchant communicates wirelessly with payment gateway 1508 in order to accomplish the wireless cash addition of funds to the consumer's account. By way of example, and not by way of limitation, the merchant may operate a cell phone or other mobile communicator device in order to perform the method seen in FIG. 15, and particularly the interaction of merchant 1512 with payment gateway 1508. As seen in FIG. 15, the consumer 1530 need not operate a cell phone or other mobile communicator. Rather FIG. 15 only shows the mobile client being operated by merchant 1512 in order to interact with payment gateway 1508 via process flow #2.

Figure 16:
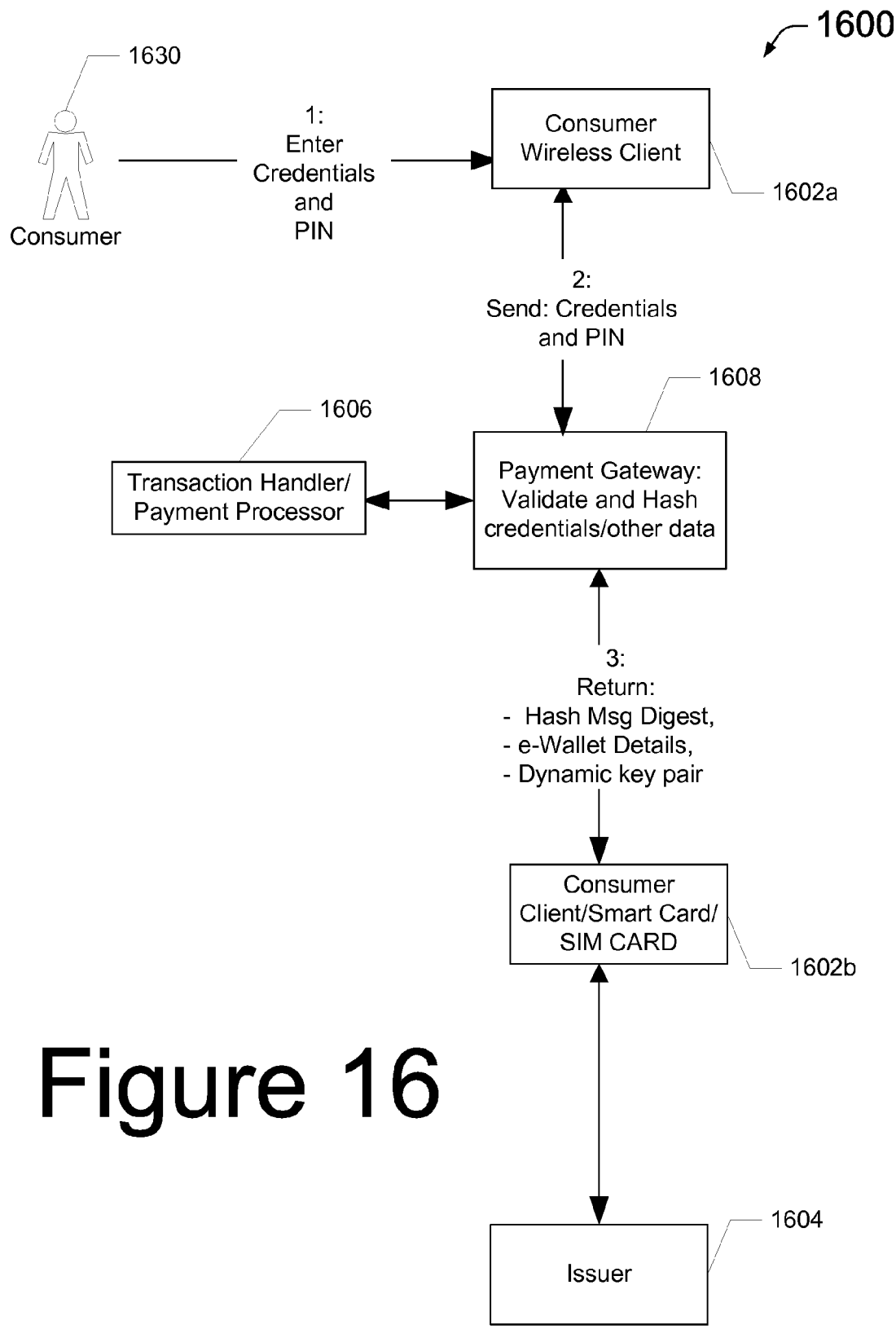
FIGS. 16-17 are flow charts depicting respective exemplary methods by which a consumer can have secure communications when conducting financially-related transactions within a payment processing system using of a wireless consumer electronics device.

FIG. 16 shows an exemplary method 1600 by which a cell phone or other portable mobile device for conducting transactions on an issued account can be activated securely. Other such mobile devices that may be activated may be a smart card or a SIM card. Method 1600 depicted in FIG. 16 begins when a consumer 1630 enters credentials and a personal information number (PIN) at process flow #1. These data are entered interactively with a mobile phone, such as consumer wireless client 1602a. Following the entry of the credentials and the PIN, process flow #2 proceeds to allow consumer wireless client 1602a to send the credentials and the PIN to a payment gateway 1608 seen in FIG. 16.

Payment gateway 1608 validates the credentials and the PIN and then hashes or otherwise obscures these data including the credentials and any other data. Payment gateway 1608 also interacts with transaction handler/payment processor 1606. Following the obscuring or hashing of the credentials and other data, process flow #3 seen in FIG. 16 returns a hashed message digest from electronic wallet details and a dynamic key pair to the consumer wireless client 1602b seen in FIG. 16. The wireless client 1602a may be different than the mobile device 1602b, such as when the mobile device 1602b is a smart card, or a SIM card and mobile device 1602a is a cell phone. Alternatively, the activated mobile device 1602a may be the same as the activated mobile device 1602b. Following the receipt of the hashed message digest, the electronic wallet details, and a dynamic key pair by consumer mobile device 1602B, method 1600 proceeds through process flow #4 to interact with an issuer 1604 who issued the account number to the consumer 1630.

As can be seen from FIG. 16, payment gateway 1608 is able to validate the credentials received from consumer wireless client 1602a so that they can be obscured through a hashing algorithm. As such, the consumer to whom the account has been issued by an issuer can avoid violation of privacy by insuring that no such private information is stored on their cell phone, SIM card or smart card. For instance, the PIN entered at process flow #2 need not be stored on the mobile device. As such, if a mobile device, such as a cell phone, is stolen from the consumer, private information about accounts, access codes, and other such credentials can not be reversed engineered or otherwise removed from the mobile device because that information is not stored on the mobile device. Rather, any such information has been obscured by a hashing algorithm performed in conjunction with payment gateway 1608 and/or transaction handler/payment processor 1606.

Figure 17:
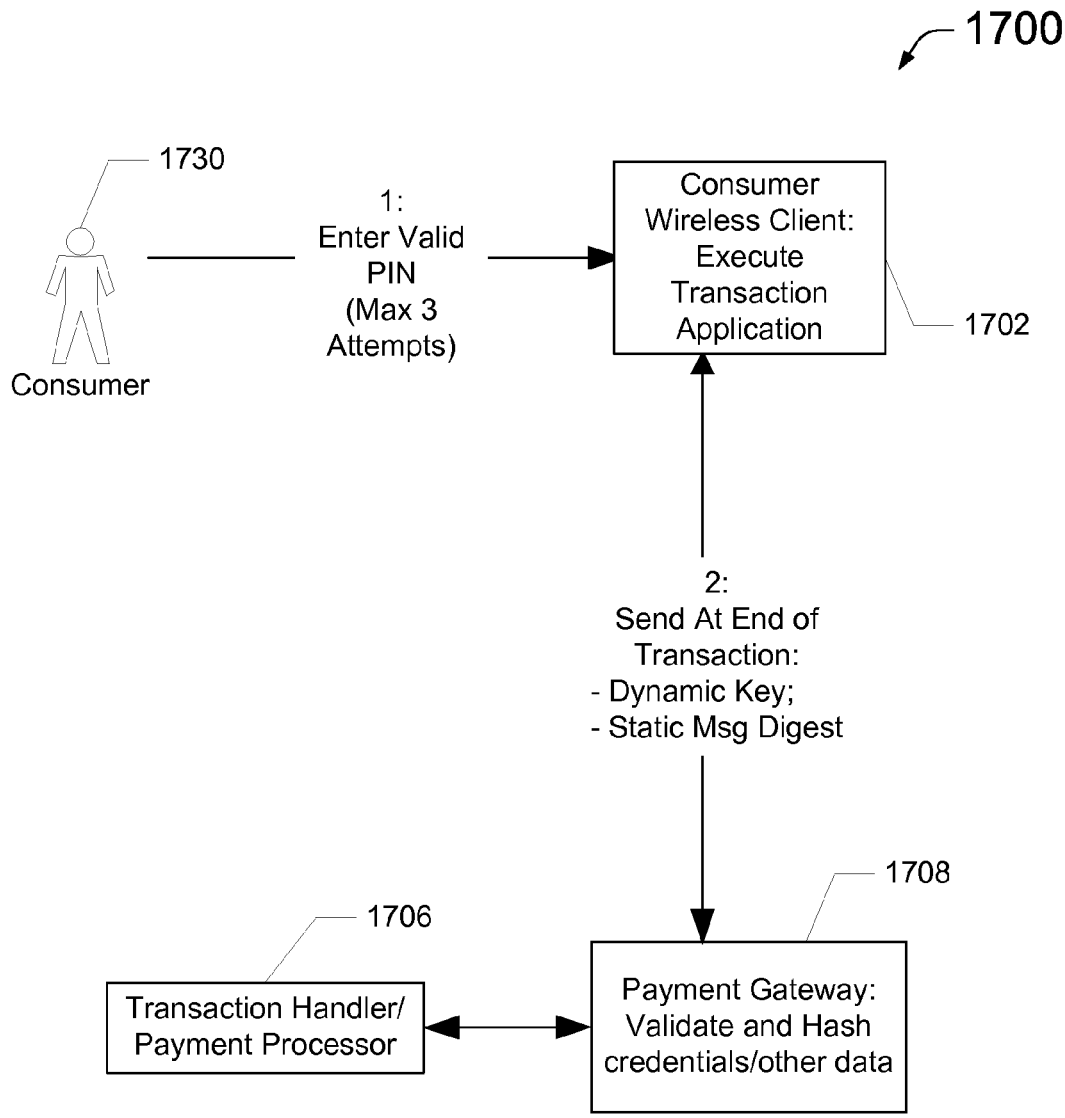

FIG. 17 shows an exemplary method 1700 that allows the authentication of a mobile device to interact in a payment processing system. Method 1700 begins with a consumer 1730 entering a valid PIN into a consumer wireless client 1702. By way of example, client 1702 can be a cell phone. As such, cell phone 1702 executes a transaction application that allows consumer 1720 to make a maximum of three tries to enter a valid personal information number (PIN). If the consumer 1730 has exceeded the number of tries to enter a valid PIN, then the cell phone 1702 is prohibited from further attempts by consumer 1703 to authenticate the cell phone for use in conducting transactions.

If consumer 1730 enters a valid PIN in process flow #1 into cell phone 1702, then method 1700 proceeds through process flow #2 to interact with a payment gateway 1708. Subsequent to the conducting of a transaction between a consumer and a merchant, or other such transactions upon an account issued to the consumer, a dynamic key and a static message digest is sent back to cell phone 1702 through process flow #2. The dynamic key and static message digest are sent from payment gateway 1708 back to cell phone 1702. The dynamic key and static message digest are derived by payment gateway 1708 by interaction with transaction handler/payment processor 1706. The security inherent in making sure the dynamic key and static message are sent to cell phone 1702 at the end of every transaction conducted by consumer 1730 ensures proper authentication, safety and security of financial transactions. With these are lower probabilities of fraudulent transactions conducted with cell phone 1702. Stated otherwise, the consumer is not permitted to use the cell phone 1702 to conduct a transaction unless the consumer enter the proper PIN, and the consumer will be prohibited from such transactions if they can not enter the valid PIN after a maximum number of tries, for instance three attempts as are seen in FIG. 17.

Implementations enabled by the foregoing description and the Figures include:

A. Secure and user friendly services for mobile devices such as cell phones and PDAs B. A prototype of a person to person money transfer solution with advance MMS notification to a receiver of the money that is transferred;

C. A prototype of a proximity payment solution using blue tooth technology

D. A mobile POS device for merchants (i.e., cell phone based applications for merchants with a need to buy any special hardware, but merely need a cell phone to conduct a POS transaction—which is used for mobile merchants such as parcel deliverers and taxi drivers E. Two Factor authentication for Non-POS (Internet) Transactions (such that a consumer need not give a credit or debit card account number to a merchant, where there is a 'Challenge and Response' Authentication Model using a cell phone, an address book facility for the consumer to have a faster checkout, and where the two factors are a PIN and a cell phone number F. Virtual Account Management using cell phone G. A consumer alert Inbox for message from a transaction processor/transaction handler H. A Payment Gateway Application for an Internet Website with which a mobile client can interact to conduct financial transactions I. Consumer and Merchant Enrollment with mobile service activation for consumers and merchants J. Electronic Wallet (e-Wallet) Management for a consumer K. Mobile Service Personalization, where the consumer selects or changes a mobile wallet for a POS Transaction with a merchant L. A strong authentication and authorization framework for a mobile device, including a PIN not stored in the mobile device, a dynamic key generated at end of each transaction which is stored in the device, a static unique message digest which is stored in the device M. An identify theft alert service N. A bill pay alert O. A fraud notification setup with fraud alerts P. Automatic bill pay setup and auto bill pay error and other alerts Q. Mobile phone initiated consumer loans R. Person to Person Money Transfer using proximity technologies S. Load of funds using merchant's mobile POS device (i.e., free cell phone based application for merchants)

T. Digital signature and data encryption capability using cryptography technologies U. Location based service (e.g., cell phone service to show where places of interest are located relative to the cell phone, such as the nearest Automotive Tell Machine, etc.)

V. Get cashing using a cell phone with an ATM or with merchant

W. A Mobile service to terminate lost and/or stolen cell phones

X. An instant gift card service through which a consumer can beam a gift card to a receiver's cell phone Y. A virtual credit card for family members (e.g., a parent can create virtual account link it to a real account and give or load that virtual account for a cell phone the parent's child)

Figure 18:
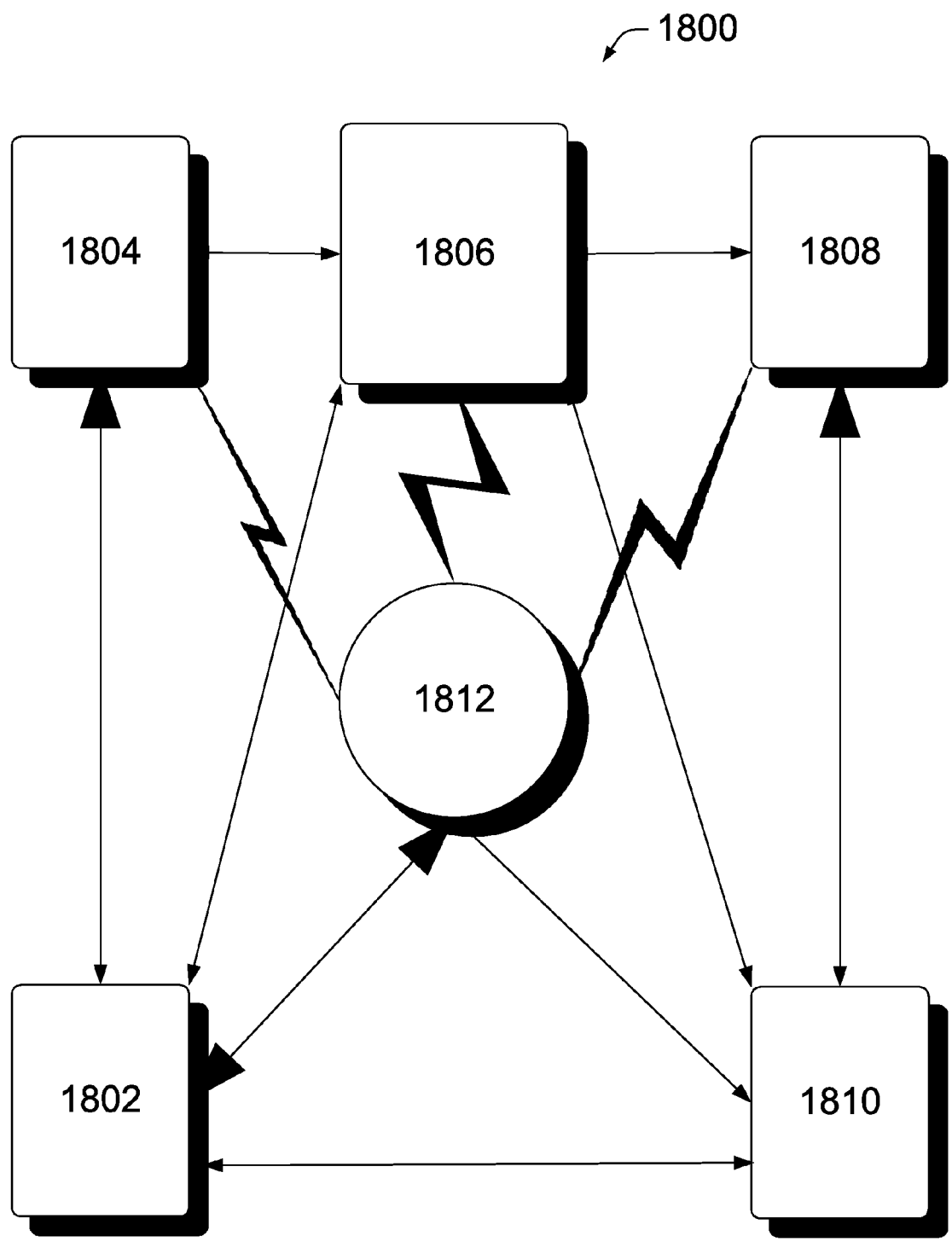
FIG. 18 illustrates a block diagram of an exemplary payment processing system within which a mobile consumer electronics device having wireless communications functionality can be used by a consumer to conduct a cashless transaction in the environment depicted in FIG. 1.

Z. A centralized e-Bill delivery, where a merchant can upload a billing statement to a consumer's account using web service, and the consumer can download/view the bills via browser and pay the bill using a debit or credit card, so that the service gets rid of payments by check A1. An instant credit card application through which a consumer can shop for a credit card issuer using their cell phone, get the credit card instantly, and use the credit to shop immediately B1. A way to request money via a text messaging function The Payment Processing System FIG. 18 illustrates a block diagram of an exemplary payment processing system 1800 within which the exemplary methods and process of FIGS. 1-3 may be practiced. As will be readily understood by persons of ordinary skill in payment processing systems, a transaction such as a payment transaction in a payment processing system can include participation from different entities that are each a component of the payment processing system. The exemplary payment processing system 1800 includes an issuer 1804 such as the issuer; a transaction handler 1806, such as the transaction handler; an acquirer 1808 such as the acquirer; a merchant 1810 such as the merchant; and a consumer 1802 such as the consenting consumer. The acquirer 1808 and the issuer 1804 can communicate through the transaction handler 1806. The merchant 1810, such as the utility provider, may utilize at least one POS that can communicate with the acquirer 1808, the transaction handler 1806, or the issuer 1804. Thus, the POS is in operative communication with the payment processing system 1800.

Typically, a transaction begins with the consumer 1802 presenting an account number of an account (e.g., non-credit account) such as through the use of a computer terminal or a portable consumer device 1812 to the merchant 1810 to initiate an exchange for a good or service. The consumer 1802 may be an individual or a corporate entity. The consumer 1802 may be an account holder of the account issued by the issuer 1804 such as a joint account holder of the account or a person having access to the account such as an employee of a corporate entity having access to a corporate account. The portable consumer device 1812 may include a payment card, a gift card, a smartcard, a smart media, a payroll card, a health care card, a wrist band, a machine readable medium containing account information, a keychain device such as the SPEEDPASS® commercially available from ExxonMobil Corporation or a supermarket discount card, a cellular phone, personal digital assistant, a pager, a security card, a computer, an access card, a wireless terminal, or a transponder. The portable consumer device 1812 may include a volatile or a non-volatile memory to store information such as the account number or a name of the account holder.

The merchant 1810 may use an acceptance point device, such as a POS, to obtain account information, such as the indicator for the account (e.g., the account number of the account), from the portable consumer device 1812. The portable consumer device 1812 may interface with the POS using a mechanism including any suitable electrical, magnetic, or optical interfacing system such as a contactless system using radio frequency, a magnetic field recognition system, or a contact system such as a magnetic stripe reader. The POS sends a transaction authorization request to the issuer 1804 of the portable consumer device 1812. Alternatively, or in combination, the portable consumer device 1812 may communicate with the issuer 1804, the transaction handler 1806, or the acquirer 1808.

The issuer 1804 may submit an authorize response for the transaction via the transaction handler 1806. Authorization includes the issuer 1804, or the transaction handler 1806 on behalf of the issuer 1804, authorizing the transaction in connection with instructions of the issuer 1804, such as through the use of business rules. The transaction handler 1806 may maintain a log or history of authorized transactions. Once approved, the merchant 1810 can record the authorization and allow the consumer 1802 to receive the good or service.

The merchant 1810 may, at discrete periods, such as the end of the day, submit a list of authorized transactions to the acquirer 1808 or other components of the payment processing system 1800 for clearing and settling. The transaction handler 1806 may compare the submitted authorized transaction list with its own log of authorized transactions. If a match is found, the transaction handler 1806 may route the clearing and settling request from the corresponding acquirer 1808 to the corresponding issuer 1804 involved in each transaction. Once the acquirer 1808 receives the payment of the transaction from the issuer 1804, it can forward the payment to the merchant 1810 less any transaction costs, such as fees. If the transaction involves a debit or pre-paid card, the acquirer 1808 may choose not to wait for the initial payment prior to paying the merchant 1810.

There may be intermittent steps in the foregoing process, some of which may occur simultaneously. For example, the acquirer 1808 can initiate the clearing and settling process, which can result in payment to the acquirer 1808 for the amount of the transaction. The acquirer 1808 may request from the transaction handler 1806 that the transaction be cleared and settled.

It should be understood implementations can be in the form of control logic, in a modular or integrated manner, using software, hardware or a combination of both. The steps of a method, process, or algorithm described in connection with the implementations disclosed herein may be embodied directly in hardware, in a software module executed by a processor, or in a combination of the two.

The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes. Based on the disclosure and teachings provided herein, a person of ordinary skill in the art will appreciate other ways and/or methods for various implements.

It is understood that the examples and implementations described herein are for illustrative purposes only and that various modifications or changes in light thereof will be suggested to persons skilled in the art and are to be included within the spirit and purview of this application and scope of the appended claims.

What is claimed is:

1. A wireless financial transaction system comprising:
a server executing a software product to provide a financial transaction Web service; and a Web enabled thick client being operated by a merchant and, at least: being served the financial transaction Web service in wireless communications with the server; and
executing a software product to conduct a financial transaction in collaboration with the financial transaction Web service,
wherein the financial transaction, at least:
is conducted by a consumer with the merchant upon an account previously issued by an issuer to the consumer and having a balance maintained by the issuer; and
is conducted using a consumer wireless client corresponding to a wireless telephone associated with a telephone number, operated by the consumer in proximity to the thick client and executing an application at least reducing a security risk with respect to account balance modifications that are not authorized by the consumer at least in part by configuring the consumer wireless client to, at least:
receive, by the consumer wireless client, a challenge code generated by the merchant based at least in part on the telephone number, the merchant being different from an entity responsible for approving or declining the financial transaction;
generate, by the consumer wireless client, a response code based at least in part on the challenge code, the response code being different from the challenge code; and
present, by the consumer wireless client, the response code to the consumer for entry in response to the challenge code generated by the merchant,
wherein the configuration of the consumer wireless client by the application at least in part thereby enables the financial transaction between the consumer and the merchant without the consumer providing the merchant with an account number of the account previously issued by the issuer;
and wherein a transaction handler or payment processor operates one or more processors to execute software to perform steps that include:
receiving, from an acquirer for the merchant, an authorization request for the financial transaction;
sending, to the issuer, the authorization request;
receiving, in response to the authorization request, an authorization response based at least in part on the balance of the account and the response code generated by the consumer wireless client; and
sending, to the acquirer for delivery to the merchant, the authorization response.

2. The wireless financial transaction system as defined in claim 1,
wherein server serves each said thick client via a hot spot where the client can connect to the Internet using a wireless local area network.

3. The wireless financial transaction system as defined in claim 1, wherein:
the thick client executes an operating system (OS) to perform OS specific commands; and
the software product to conduct the financial transaction is byte code converted by a Java Virtual Machine (JVM) into the OS specific commands performed by the OS.

4. The wireless financial transaction system as defined in claim 1, wherein: the financial transaction, at least:
is submitted by the merchant to the acquirer for processing by the transaction handler or payment processor; and
is submitted by the transaction handler or payment processor to the issuer to obtain a payment amount for the financial transaction from the account;
the server is operated as payment gateway by the transaction handler or payment processor, and
the issuer forwards the payment amount of the financial transaction to the transaction handler or payment processor who forwards the payment amount of the financial transaction to the acquirer to pay the merchant for the financial transaction.

5. A wireless financial transaction system in accordance with claim 1,
wherein the application further configures the consumer wireless client at least to receive, from the consumer, by the consumer wireless device and prior to presenting the response code to the consumer, an explicit verification that the merchant that generated the challenge code is an intended recipient of funds.

6. A wireless financial transaction system in accordance with claim 1,
wherein the security risk reduction comprises enabling two factor authentication, the two factors including possession of the consumer wireless device and knowledge of a personal identification number (PIN) different from the challenge code and the response code.

7. A wireless financial transaction system in accordance with claim 1, wherein the application further configures the consumer wireless client at least to:
provide, by the consumer wireless client and in response to receiving the challenge code generated by the merchant, a first user interface allowing the consumer to select an internet address associated with the merchant with which the financial transaction is to be conducted;
provide, by the consumer wireless client and in response to receiving a selection of the internet address associated with the merchant, a second user interface presenting at least the selected internet address associated with the merchant;
receive, by the consumer wireless client and with the second user interface, a confirmation from the consumer that the financial transaction is to be conducted with the merchant associated with the selected internet address; and
generate the response code in response to receiving the confirmation from the consumer.

8. A wireless financial transaction system in accordance with claim 1, wherein the application further configures the consumer wireless client at least to:
receive, by the consumer wireless client and in connection with the challenge code generated by the merchant, a personal identification number;
provide, by the consumer wireless client and in response to receiving the challenge code generated by the merchant and the personal identification number, an address selection user interface allowing the consumer to select an internet address associated with the merchant with which the financial transaction is to be conducted;
receive, by the consumer wireless client and with the provided address selection user interface, a selection of the internet address associated with the merchant;
provide, by the consumer wireless client and in response to receiving the internet address associated with the merchant, a merchant verification user interface presenting at least the selected internet address associated with the merchant and a payment amount for the financial transaction with the merchant;

receive, by the consumer wireless client and with the provided merchant verification user interface, a confirmation from the consumer that the financial transaction for the payment amount is to be conducted with the merchant associated with the selected internet address presented with the merchant verification user interface; and generate the response code in response to receiving the confirmation from the consumer.

9. A wireless financial transaction system comprising:

a server executing a plurality of software products to serve a financial transaction Web service; and a Web enabled thin client, at least:
  being served the financial transaction Web service in wireless communications with the server; and
  executing a software product to conduct a financial transaction in collaboration with the financial transaction Web service, wherein the financial transaction, at least:
  is conducted using a consumer wireless client corresponding to a wireless telephone associated with a telephone number, operated by a consumer in proximity to the thin client and executing an application at least reducing a security risk with respect to account balance modifications that are not authorized by the consumer at least in part by configuring the consumer wireless client to, at least:
    receive, by the consumer wireless client, a challenge code generated by the merchant based at least in part on the telephone number, the merchant being different from an entity responsible for approving or declining the financial transaction;
    generate, by the consumer wireless client, a response code based at least in part on the challenge code, the response code being different from the challenge code; and present, by the consumer wireless client, the response code to the consumer for entry in response to the challenge code generated by the merchant, wherein the configuration of the consumer wireless client by the application at least in part thereby enables the financial transaction between the consumer and the merchant without the consumer providing the merchant with an account number of the account previously issued by the issuer; and
  is conducted with the merchant upon an account previously issued by an issuer to the consumer and having a balance maintained by the issuer;

and wherein a transaction handler or payment processor operates one or more processors to execute software to perform steps that include:
  receiving, from an acquirer for the merchant, an authorization request for the financial transaction;
  sending, to the issuer, the authorization request;
  receiving, in response to the authorization request, an authorization response based at least in part on the balance of the account and the response code generated by the consumer wireless client; and
  sending, to the acquirer for delivery to the merchant, the authorization response.

10. The wireless financial transaction system as defined in claim 9, wherein:
  the thin client executes an operating system (OS) to perform OS specific commands;
  the software product to conduct the financial transaction is byte code converted by a Java Virtual Machine (JVM) into the OS specific commands performed by the OS.

11. The wireless financial transaction system as defined in claim 9,
  wherein the thin client is selected from the group consisting of a palm top computer, a Personal Digital Assist (PDA), a network card, a cable or satellite set-top box, and an audio visual telephonic screen phone.

12. The wireless financial transaction system as defined in claim 9,
  wherein the thin client has a Connected Limited Device Configuration (CDLC) with a J2ME configuration.

13. The wireless financial transaction system as defined in claim 12, wherein:
  the thin client executes an operating system (OS) to perform OS specific commands;
the software product to conduct the financial transaction is byte code converted by a compact Java Virtual Machine (KVM) into the OS specific commands performed by the OS.

14. The wireless financial transaction system as defined in claim 13,
  wherein the thin client is selected from the group consisting of a Point Of Sale terminal (POS) operated by the merchant, a pager, and a smart cellular telephone.

15. The wireless financial transaction system as defined in claim 13,
  wherein the Web and J2ME enabled thin client is served the financial transaction Web service in a blue tooth wireless communications with the ME enabled server.

16. The wireless financial transaction system as defined in claim 9, wherein:
  each said financial transaction, at least:
  is submitted by the merchant to the acquirer for processing by the transaction handler or payment processor; and
  is submitted by the transaction handler or payment processor to the issuer to obtain a payment amount for the financial transaction from the account;
  the server is operated as a payment gateway by the transaction handler or payment processor; and
  the issuer forwards the payment amount of the financial transaction to the transaction handler or payment processor who forwards the payment amount of the financial transaction to the acquirer to pay the merchant for the financial transaction.

* * * * *